United States Patent [19]

Adams et al.

[11] Patent Number: 4,866,714
[45] Date of Patent: Sep. 12, 1989

[54] PERSONAL COMPUTER-BASED DYNAMIC BURN-IN SYSTEM

[75] Inventors: Jerry G. Adams, Brooksville; Robert P. Gibson, Palm Harbor, both of Fla.; Denis A. Mueller, Asheville, N.C.

[73] Assignee: Westinghouse Electric Corp., Pittsburgh, Pa.

[21] Appl. No.: 108,672

[22] Filed: Oct. 15, 1987

[51] Int. Cl.$^4$ .................. G06F 11/00; G01R 31/28
[52] U.S. Cl. .................... 371/22.1; 371/16.1
[58] Field of Search ............ 371/16, 20, 25, 28; 324/73 R, 73 AT, 73 PC; 364/551, 579, 580

[56] References Cited

U.S. PATENT DOCUMENTS

| | | | |
|---|---|---|---|
| 4,627,056 | 12/1986 | Awane et al. | 371/16 |
| 4,694,408 | 9/1987 | Zaleski | 364/551 |
| 4,706,208 | 11/1987 | Helms | 364/580 |
| 4,709,366 | 11/1987 | Scott et al. | 371/20 |
| 4,713,815 | 12/1987 | Bryan et al. | 371/209 |
| 4,718,064 | 1/1988 | Edwards et al. | 371/20 |

OTHER PUBLICATIONS

G. Ost, The Practice and Economy of Burn-In, Electronic Engineering, Aug. 1986, pp. 37–43.
Park, Effect of Burn-In on Mean Residual Life, IEEE Trans. on Reliability, vol. R–34, No. 5, Dec. 1985, pp. 522–523.

Primary Examiner—Charles E. Atkinson
Attorney, Agent, or Firm—C. M. Lorin

[57] ABSTRACT

An installation for the dynamic burn-in testing of a plurality of digital circuits, and/or microcomputer-controlled circuits, mounted in a burn-in chamber for testing includes a personal computer; power supply for the digital circuits, and a bilateral line of communication between the PC computer and each of the digital circuits; the PC computer interrogating separately, and at will, any of the digital circuits as to their status and capability of changing status while retrieving any indication of a critical testing condition from any digital circuit, to determine a failure-free burn-in time.

7 Claims, 27 Drawing Sheets

CUMULATIVE DISTRIBUTION FUNCTION

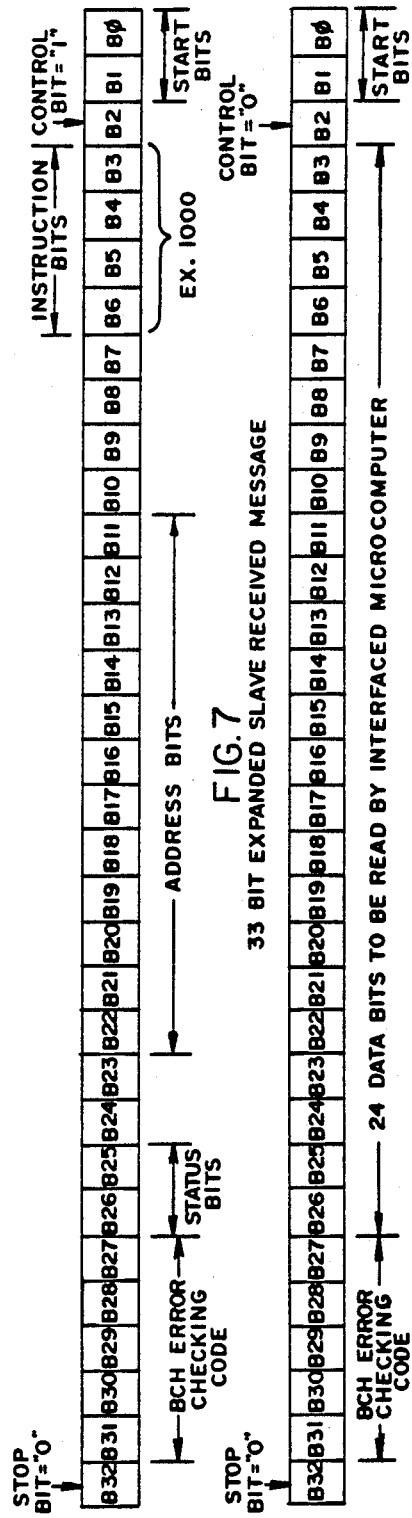

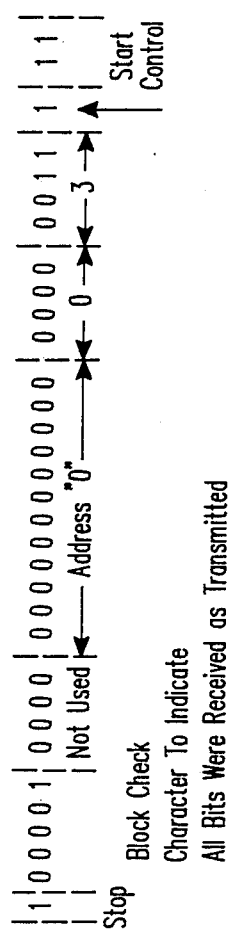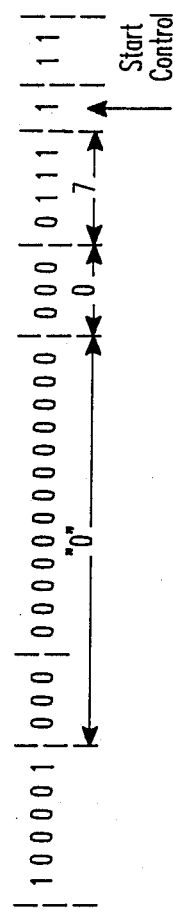

PROM TEST STEPS OUTPUT COMPARE

| | 1 | 2 | 3 | 4 | 5 | 6 | 7 | 8 | 9 | 10 | 11 | 12 | 13 | 14 | |
|---|---|---|---|---|---|---|---|---|---|---|---|---|---|---|---|
| A | 0 | 1 | 0 | 1 | 1 | 1 | 1 | 1 | 1 | 1 | 1 | 1 | 1 | 1 | X |
| B | 0 | 0 | 1 | 1 | 1 | 1 | 1 | 1 | 1 | 1 | 1 | 1 | 1 | 1 | X |
| C | 0 | 0 | 0 | 0 | 1 | 1 | 1 | 1 | 1 | 1 | 1 | 1 | 1 | 1 | X |
| D | 0 | 0 | 0 | 0 | 0 | 1 | 1 | 0 | 0 | 0 | 0 | 0 | 0 | 0 | X |
| E | 0 | 0 | 0 | 0 | 0 | 0 | 1 | 0 | 0 | 0 | 1 | 1 | 1 | 1 | X |
| F | 0 | 0 | 0 | 0 | 0 | 0 | ↑ | 0 | ↑ | 0 | 0 | ↑ | 1 | 1 | X |
| G | 0 | 0 | 0 | 0 | 0 | 0 | 0 | 0 | 0 | 0 | 0 | 0 | 0 | 1 | X |
| H | 0 | 0 | 0 | 0 | 0 | 0 | 0 | 1 | 1 | 0 | 0 | 0 | 1 | 1 | X |
| J | 0 | 0 | 0 | 0 | 0 | 0 | 0 | 0 | 0 | 0 | 0 | 0 | 0 | 0 | X |
| K | 0 | 0 | 0 | 1 | 1 | 1 | 1 | 1 | 1 | 1 | 1 | 1 | 1 | 1 | C |
| L | 0 | 0 | 0 | 0 | 0 | 0 | 1 | 1 | 1 | 0 | 0 | 0 | 0 | 0 | C |
| M | 1 | 1 | 1 | 1 | 1 | 1 | 0 | 0 | 0 | 1 | 1 | 1 | 1 | 1 | C |
| N | 0 | 0 | 0 | 0 | 0 | 0 | 0 | 0 | 0 | 0 | 1 | 0 | 0 | | W |

FIG. 12

INTERFACE FLOW CHART FOR MICROCOMPUTER—84

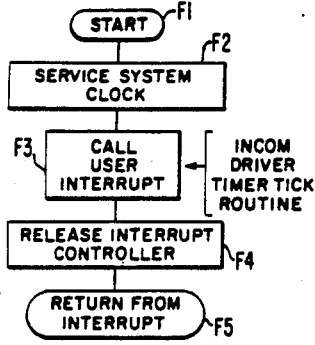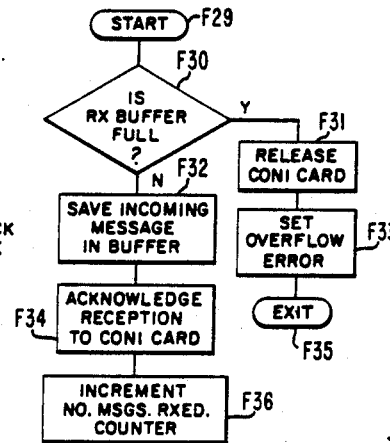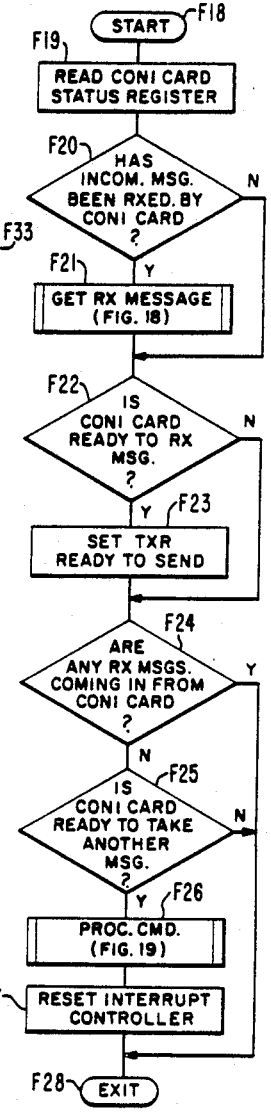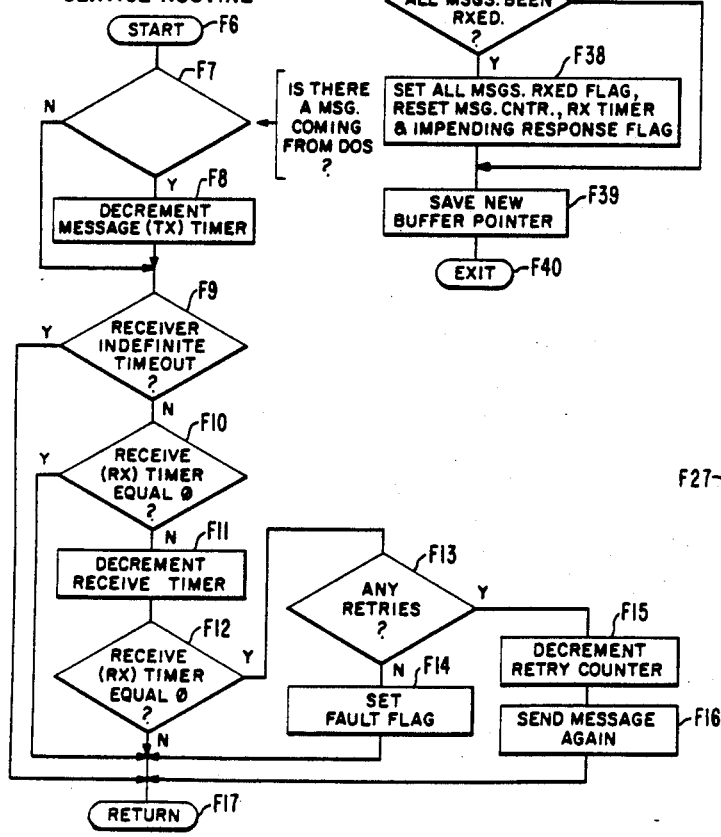

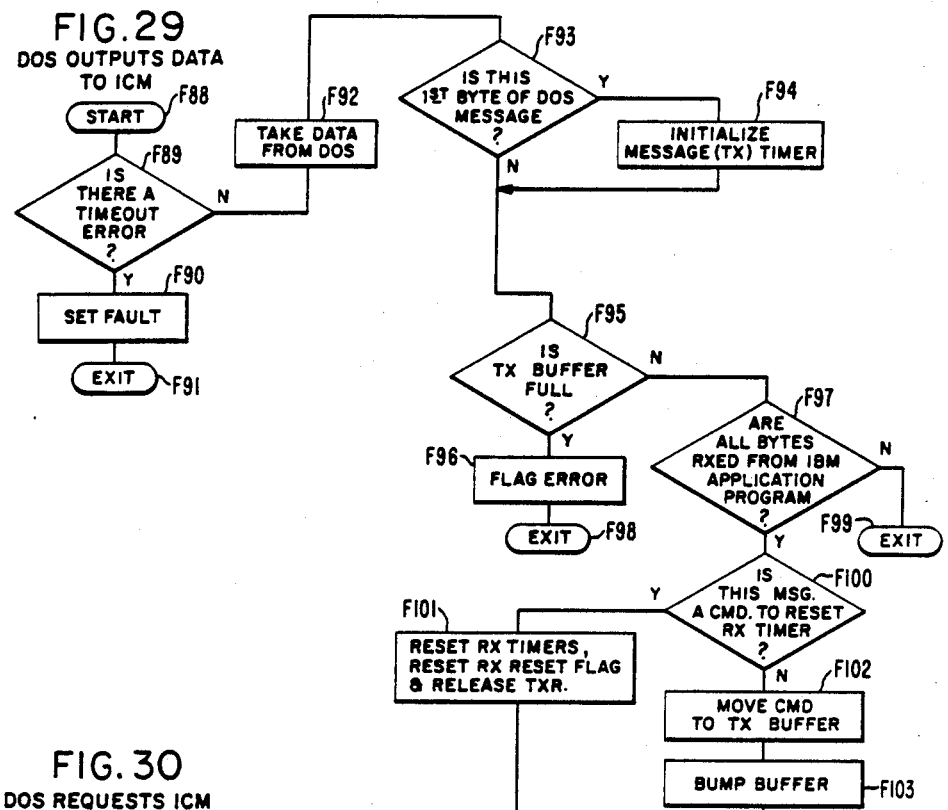
FIG. 29 DOS OUTPUTS DATA TO ICM
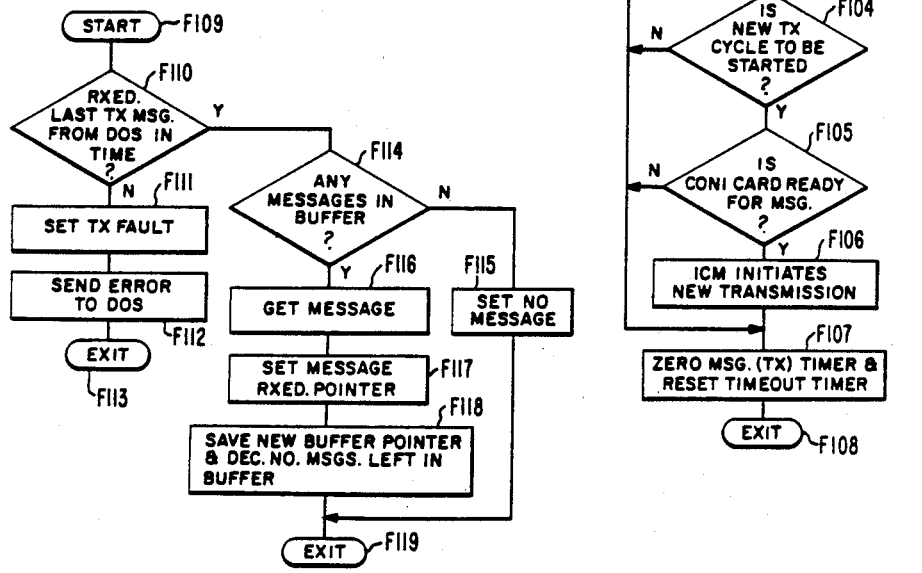
FIG. 30 DOS REQUESTS ICM TO INPUT DATA TO DOS

PERSONAL COMPUTER-BASED DYNAMIC BURN-IN SYSTEM

CROSS-REFERENCE TO RELATED APPLICATIONS

The invention disclosed herein involves a two-way communication and control system. The following commonly assigned United States patent applications relate to such a communication and control system:

1. Ser. No. 769,640 filed Aug. 26, 1985 by John C. Schlotterer and entitled "Communication and Control Network Interface for Personal Computer" (W.E. Case No. 52212); and
2. Ser. No. 769,642 filed Aug. 26, 1985 and now U.S. Pat. No. 4,833,600, issued 5/23/89, to B L. Brodsky and entitled "Computer Driver Module for Master Interface to Communication and Control Network" (W.E. Case No. 52214)

The above two mentioned patent applications are hereby incorporated by reference.

INCORPORATED BY REFERENCE UNITED STATES PATENTS

The following United States patents describe a two-way communication and control system as embodied in the best mode of implementation of the present invention:

U.S. Pat. No. 4,644,547 issued Feb. 17, 1987;
U.S. Pat. No. 4,644,566 issued Feb. 17, 1987;
U.S. Pat. No. 4,653,072 issued Mar. 24, 1987;
U.S. Pat. No. 4,653,073 issued Mar. 24, 1987.

These four U.S. patents are hereby incorporated by reference.

BACKGROUND OF THE INVENTION

The invention relates in general to BURN-IN, i.e. a method of screening out early failures in a high temperature chamber among electronic components, devices and/or assemblies thereof as received directly out of production. The invention is more particularly applicable to burn-in of printed-circuit boards, of circuit elements of a printed-circuit board and to microcomputers combining such printed-circuit boards and circuit elements.

Techniques and procedures for burn-in have been described in "BURN-IN" by Finn Jensen and Niels Petersen, published by John Wiley and Sons, reprinted in 1985. As explained therein, burn-in is a testing method performed on electrical and electronic components, subassemblies and complete systems thereof, for detecting early failures, and for replacing or repairing such units which have failed under constant exposure to predetermined environmental stress, thereby to insure reliability for the circuits and systems once they have been placed in use with the customers. A reliability test is conducted in a chamber at a critical temperature, or a critical change thereof, for a duration sufficient to ascertain that the product is failure-free.

The invention deals particularly with the problem of ascertaining product reliability in printed-circuit board-based systems, especially where such printed-circuit boards are microprocessor-based. In this regard, the invention aims at dynamic burn-in testing in a real life operative system, as opposed to prior art testing of circuit elements which have been conducted outside of their normal working conditions.

Prior art burn-in has mainly consisted in testing pieces of equipment as available commercially and tying them together over a bus structure within the testing chamber. This was done, however without the benefit of data logging as would be performed live with the original system under burn-in testing. See for instance U.S. Pat. Nos. 4,542,341; 4,636,725; and 4,636,726 all of A. Santomango. The systems described there mainly consist in the design of racks intended to be wired into electronic test equipment disposed outside the burn-in chamber, wherein the racks are associated with trays capable of accommodating the several units to be tested in various shapes, sizes and assemblies.

The sophistication involved with computer systems and their electronic components or subassemblies requires a constant monitoring of the many units under test for occasional withdrawal of a unit which fails, its replacement or repair, and the determination of a sustained quality of operation under sufficient and controlled stress so as to either provoke failure upon weakness, or confirm reliability under stress within accepted tolerance.

Burn-in is specially applicable to electronic components, integrated circuits and printed-circuit boards. The device under test (DUT) may fail because of a short-circuit, an open circuit, or an out of tolerance parameter, caused by an excessive temperature, voltage, or current. Therefore, an accurate and constant supervision and data collection are required with respect to the many and various units under test, some of minor, others of major importance and relatively large complexity, for instance the operation of a microcomputer, as opposed to less complex components, like a ROM, or a RAM device. The cost of a burn-in installation does not rest only on the equipment installed for testing, like the burn-in chamber and its associated control and power supply. It must also have facilities which make it adaptable to a quick new batch being put to test by the operator, and to instant replacement or repair of a failing device. This implies the possibility to monitor all the devices under test (DUT's) live and under known testing conditions. For this purpose, the use of a computer to supervise burn-in operations and maintain data retrieval is of a major importance for burn-in testing.

It is known to use a computer for burn-in: "Modularity, the Innovation with Burn-In Equipment" by G. Ost in TEST (G.B.) vol. 6, pages 37–46; September 1984. The present invention goes further than there disclosed. It is now proposed to take advantage of the modern availability, the low cost and the sophistication of the personal computer to control and monitor burn-in testing. The merits of the personal computer have been recognized. See for instance:

1/"Personal Computers: They Take It All Apart" by D. B. Knies Lincoln Hallen, in Proceedings IEEE/Reliability & Maintainability—1986 pp. 415–418; 2/"Personal Computer—Based ROM Evaluation System" by C. Y. E. Yang, O. B. Winterble & R. A. Olah in Proceedings IEEE/Applications of Mini and Microcomputers—San Francisco Nov. 9–12, 1981.

Nevertheless, a personal computer is not readily usable for burn-in testing monitoring, and there is a special combination of factors required in order to achieve a perfect system for such a very particular application.

On the other hand, computer-based and computer-monitored supervision of the status and of the operative conditions of remotely located slave components, tools, processes, ... has been considered in the prior art. See for instance U.S. Pat. Nos. 4,573,115; 4,472,783; 4,432,064; 4,112,416 and 4,086,568.

Digital and automatic testing of complex semiconductor components and circuit boards have been known. See for instance U.S. Pat. Nos. 4,348,760; 4,348,759; 4,322,846; 4,195,770; 4,195,769; and 4,162,396. Typically, fault-testing is involved in U.S. Pat. No. 4,438,769; testing of functional failure in a RAM device is described in U.S. Pat. No. 4,195,770; and faulty components are the object of detection upon a circuit board under test in U.S. Pat. No. 4,348,760.

In contrast to the above-mentioned prior art, the present invention aims at reliability tests conducted under burn-in operation with a personal computer. Problems involved with burn-in have been noted in the following references:

Electronic Engineering (Aug. 1986) pp. 37–43/Gustav Ost;

Elektronik No. 16 (Aug. 10, 1984) pp. 45–48/Gustav Ost;

IEEE Transactions vol. R34, No. 5 Reliability (Dec. 5, 1985)/Kyung S. Park/pp. 522–523/"Effect of Burn-in on Mean Residual Life".

SUMMARY OF THE INVENTION

Burn-in testing and monitoring of electronic components and printed circuit boards are effected dynamically by the operator with the aid of a personal computer (P.C.) placed in proximity of the burn-in chamber and connected to the devices under test (DUT's) by a communication link possessing all the key elements for communication, monitoring and control both-ways between the DUT's and the PC computer.

Dynamic burn-in testing, monitoring and control system, according to the present invention, operates either in a master-slave relationship with respect to the DUT, the latter being a Stand-Alone Slave like a RAM, ROM, a Buffer, a Flip-Flop, . . . or other components passively performing an individual function, or in an Expanded Master-Slave relationship with respect to the DUT, in which case an onboard microcomputer is associated with the DUT, or is an active part of it. In the latter instances, the DUT under test is operating freely as in real life, allowing interrogating by the operator through the PC computer and via the communication link for monitoring, control, or data retrieval.

The DUT's in either of the two above-stated forms, or both, are enclosed in the burn-in chamber and cyclically, or acyclically called for, via the PC computer, in turn, or selectively by the operator. Continuous operation during testing is provided and availability of information upon interrogation is achieved with the PC computer at the operator station. Constant monitoring, data logging and detection of failure is effected without interruption of the testing and burn-in procedure, with a large number of units under test and under interrogation, with replacement or repair being managed under continuous supervision and control of the many units in the burn-in chamber.

BRIEF DESCRIPTION OF THE DRAWINGS

FIGS. 6 and 7 show a message bit format as can be used for transmitted and received words, respectively;

FIG. 8A illustrates a message by the PC computer requesting the, INCOM interface to perform definite instructions upon a DUT;

FIG. 8B shows a message acknowledging from a DUT its status in the instance of FIG. 8A;

FIG. 9 is a message as would be received from a DUT unit in an expanded slave mode when returning data, typically from a buffer therein, the message being in ASCii form;

FIG. 12 is a table of truth illustrating for a DUT the testing operation of a test PROM/Micro-processor under dynamic test during burn-in;

FIGS. 24 to 30 are flow charts of the INCOM operation.

DESCRIPTION OF THE PREFERRED EMBODIMENT OF THE INVENTION

The invention relates to burn-in testing used to force potential failures to occur during burn-in in order to ascertain product reliability with regard to printed circuit board based systems, especially where the printed-circuit boards are micro-computer based. The problem with such testing procedure is to be able to handle many products to be tested and burn-in simultaneously. In this respect, the prior art has proposed to merely tie-up the products together at the burn-in station over a IEEE-488 Bus to derive information, but practically with no data logging capability.

Dynamic burn-in testing is now proposed using a personal computer (PC) as the major tool of the operator in monitoring and controlling the burn-in procedure for a large number of products of many different operative characteristics simultaneously and within a prescribed testing period. The PC computer is associated with a communication system extending to all the units under test (DUT's). The invention will be described in the context of a communication system such as de- scribed in the aforestated incorporated by reference U.S. patents and patent applications. Such communication system will be hereinafter referred to as the IN-COM, namely, the communication network described in the afore-mentioned incorporated by reference U.S. patents and patent applications.

Burn-in testing will be illustrated in the context of a Markovian Burn-in, with replacement or repair of the failing device (DUT) before renewed testing. The Markov method of ascertaining reliability of a product by burn-in has been described in the afore-stated F. Jensen and N. E. Petersen book. The method can be summarized as follows:

Assuming one microprocessor integrated circuit as a major weak component of a printed circuit board, and additional minor weak components in the vicinity thereon which are in the form of integrated circuits (IC's), it can be said that the more complex microcomputer will have a greater probability of failure than the less complex support components which are part of the overall unit. Nevertheless, for the burn-in procedure, all the IC components are to be considered weak. In a component reliability environment it is possible to determine the optimum amount of time that a printed circuit board, or system, should be burn-in in order to eliminate all of the possible "infant mortality" components while keeping economic feasibility. If the system has a certain number of weak components that are expected to fail during some burn-in period, every weak component which fails will be repaired so that the burn-in procedure is continued with the total system until a failure-free period (Tm) is obtained. Based on such failure-free period an optimum burn-in time for the particular PC boards, or system is to be determined, namely an amount of time sufficient to eliminate all of the possible infant mortality components while still remaining economically possible.

Figure 1A:
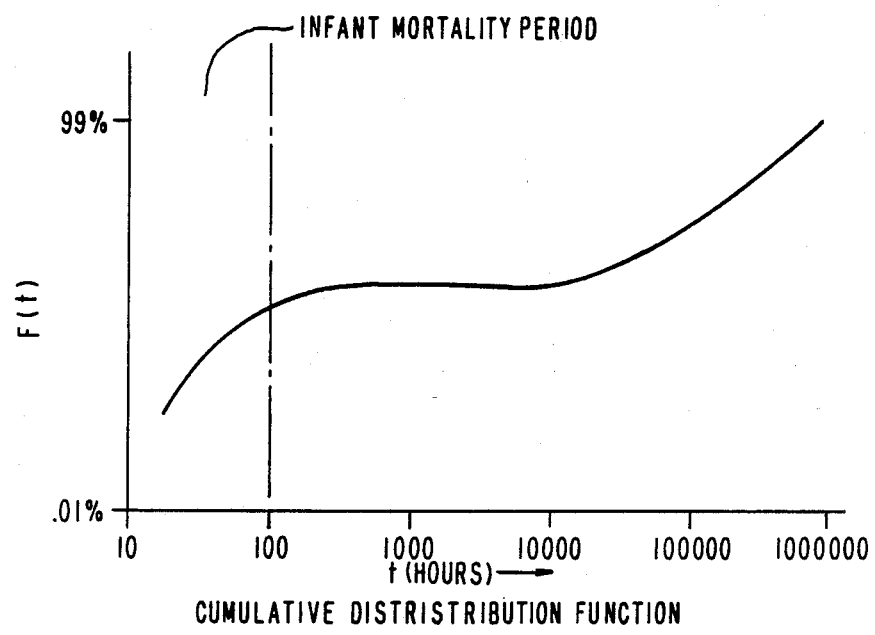
FIGS. 1A and 1B graphs illustrating the probability of failure under the markovian burn-in method.

Referring to the graph of FIG. 1A, a Markovian cumulative distribution function F(t) is shown as a function of t (time in hours) representing the probability of failure, namely when the infant mortality failures do occur. Typically, they will mostly occur during the first 100 hours. This period will be reduced to an optimum period and parameters in the burn-in process will be used to increase stresses, so as to accelerate the occurrences of failures and bring the probability determination within such optimum period In determining the actual optimum time and the effect thereon of the acceleration factor certain assumptions will be made:

1/The system under testing, i.e. the DUT, typically a printed circuit board, is placed on burn-in until, following repair or replacement of any failing component, it has experienced a failure-free period of Tm;

2/The weak components have times-to-first failure that follow an exponential distribution with a hazard rate 1 (the potential rate of delay) according to the function F(t)=e snt.

Figure 1B:
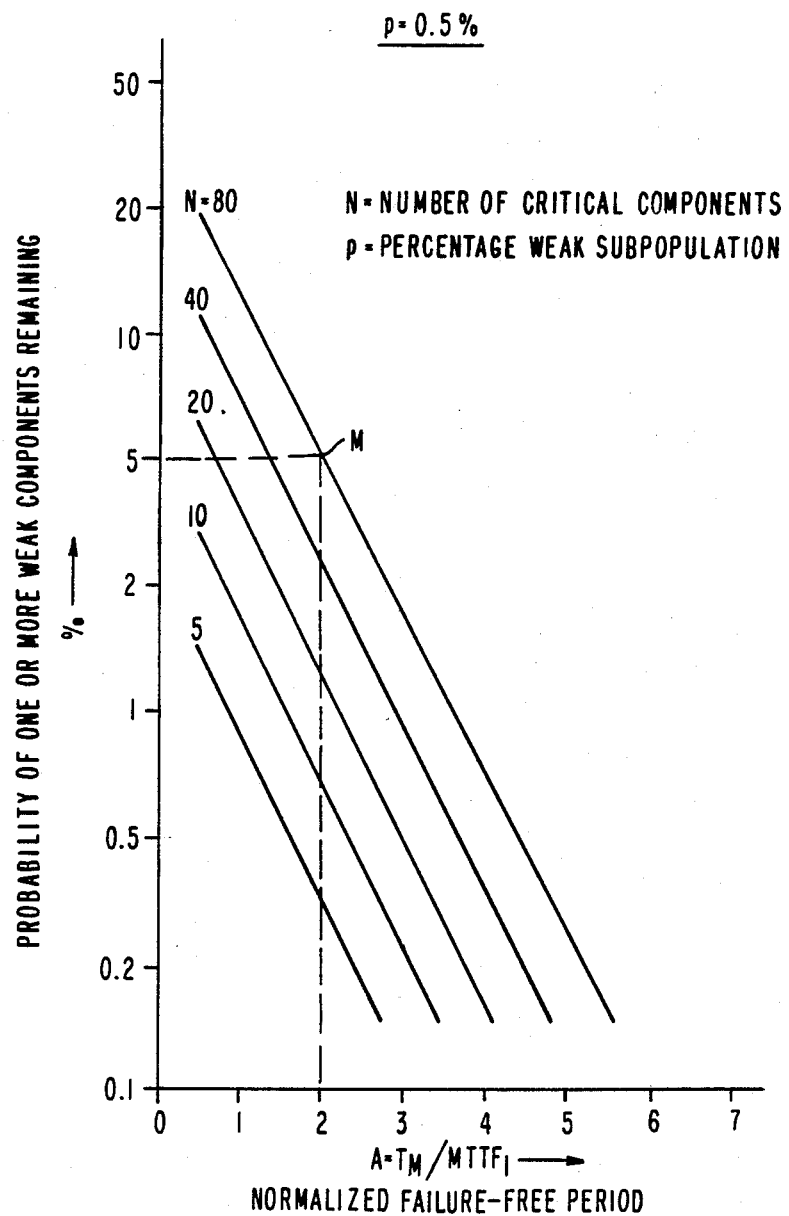

Referring to FIG. 1B, a graph shows a family of curves representing the percentage PB of weak components that the batch of products manufactured will be letting out to customers, assuming a percentage of weak components p=0.5%. It is assumed that the system is all digital and includes 100 components. If the percentage PB is 5%, there are 80 components which are critical (N) This is indicated by operative point M on curve 80. For such point, the graph of FIG. 1b indicates a normalized failure-free period A=Tm/MTTF=2.0.

Tm is the optimum time period, which is equal to (A.MTTF).

If MTTF is, for instance, 24 hours, it appears that: Tm=48 hours. This is assumed to be under burn-in at 25° C.

In order to accelerate the burn-in effectiveness and reduce the number of burn-in hours required, while still forcing the infant—mortality components out of the system during burn-in, the stress applied is increased. It will be assumed that in the burn-in station the temperature is increased from, say 55° C., up to 65° C. Accordingly, reference is made to the classical Arrhenius reliability equation:

$$r = A \cdot e^{(EA/KT)}$$

where EA is the activation energy in electron-volts; K is the Boltzman constant; T temperature in o Kelvin; A is a constant set to 1 in this instance and EA is also set to 1 considering the particular type of circuitry. When the equipment of the burn-in installation is powered up so as to bring the temperature to 65° C., the reaction rate r is increased. Considering the afore-stated exponential distribution $F(t) = e^{t \cdot \lambda sn}$ with $\lambda sn = 1$ as the hazard rate, $$MTTF1 = 1/\lambda_1, \text{ and } \lambda_{sn} = \lambda_1.$$

By increasing from 55° C. to 65° C., the ratio of increase is:

$$\frac{65° C}{55° C} = \frac{A \cdot e^{\{EA/K[1/T55° - 1/T65°]\}}}{} = A \cdot e^{\{EA/K[1/T55o - 1/T65o]\}} =$$

$$1 \cdot e^{\{EA/K[1/328 - 1/338]\}} = 2.1$$

Therefore, by increasing the burn-in temperature from 55° C. to 65° C. there is an acceleration factor of 2.1. Based on Tm=A.MMTF=48 hours, with r=2.1 as the multiplier for the expected weak components to surface, Tm=(A·MTTF)/2.1=22.857, thus, practically 24 hours 6 (instead of 48 hours) conducted at 65° C.

with 5% weak components still present when shipped to customer.

It is the purpose of the present invention to provide a system allowing burn-in testing and monitoring of integrated circuits, printed circuit boards and operational assemblies thereof received out of production and enclosed within a burn-in chamber, during successive failure-free periods as reliability tests. The system according to the present invention will be described as implemented with an INCOM system such as described in the afore-stated incorporated by reference U.S. patents and patent applications.

Figure 2:
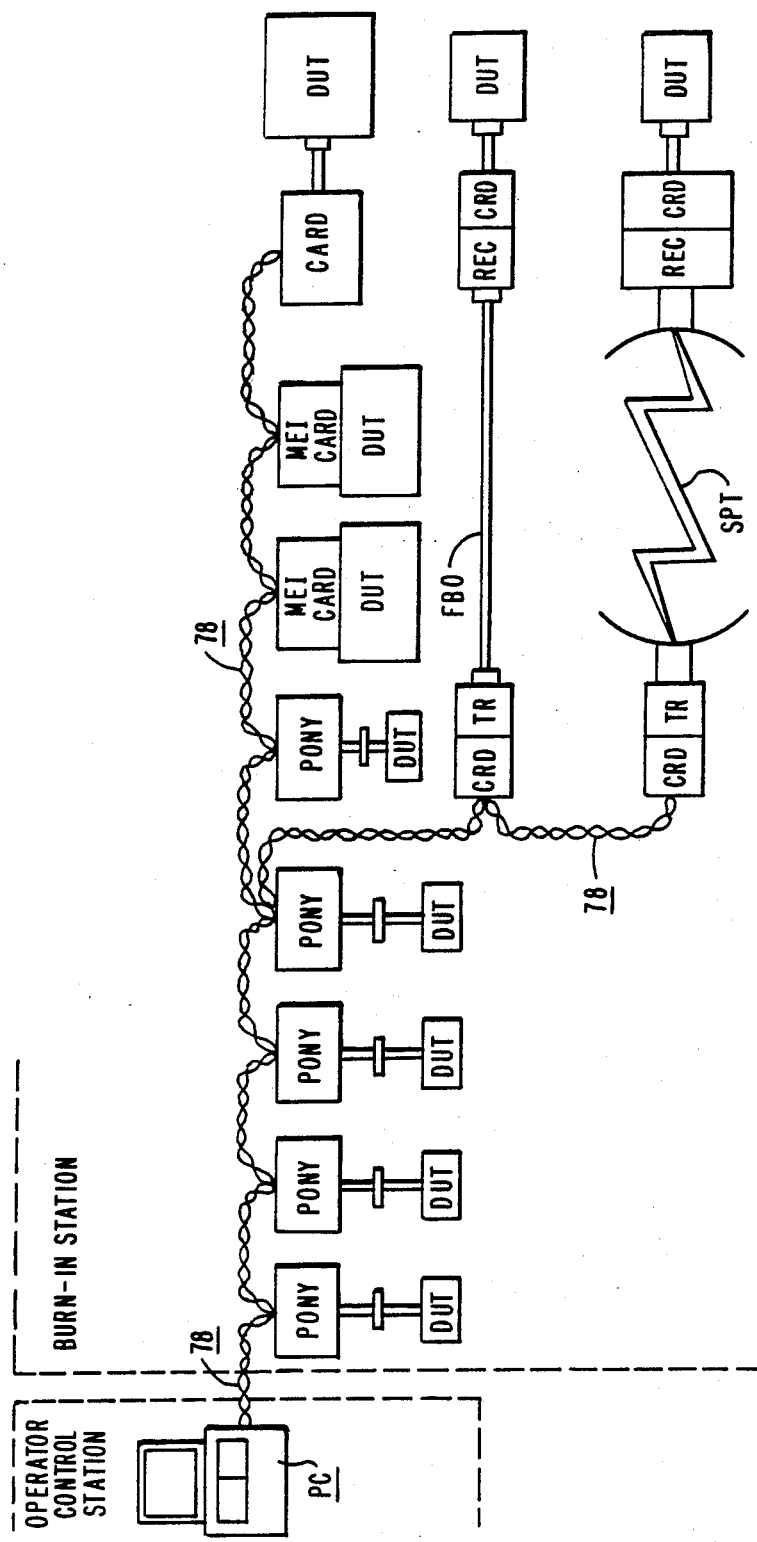
FIG. 2 schematically shows the burn-in station and the operator control station with their line of communication as part of the dynamic burn-in system according to the present invention.

Referring to FIG. 2, the operator is located at the operator control station OCS where a PC computer is connected through a line of communication 78 consisting, illustratively, in a two-wire line interfaced with the PC computer with a CONI (Communication Interface) card on one side, and with a PONY card interfacing with the device under test (DUT) within the burn-in chamber BIS. Within the chamber, the line of communication is a two-wire daisy line joining a number of DUT's. As shown, four DUT's each via one PONY card are first lined-up. Then, there is a branching. The first branching goes to one DUT with its PONY card, follwed by two OUT's eachhaving a MET card inbetween, and finally a DUT connected to the line of communication via a card CRD not identified for the purpose of generalization. The second branching goes first to a DUT with its own card, but here the communication is via fiber optics connecting a transmitter TR to a receiver REC from the INCOM to the DUT unit. The second branching also includes a DUT with its own card but here the communication between INCOM and DUT is done by telemetry (TLM). Indeed, the two-wire daisy line 78 may continue beyond the branchings shown, within the burn-in station.

Figure 3:
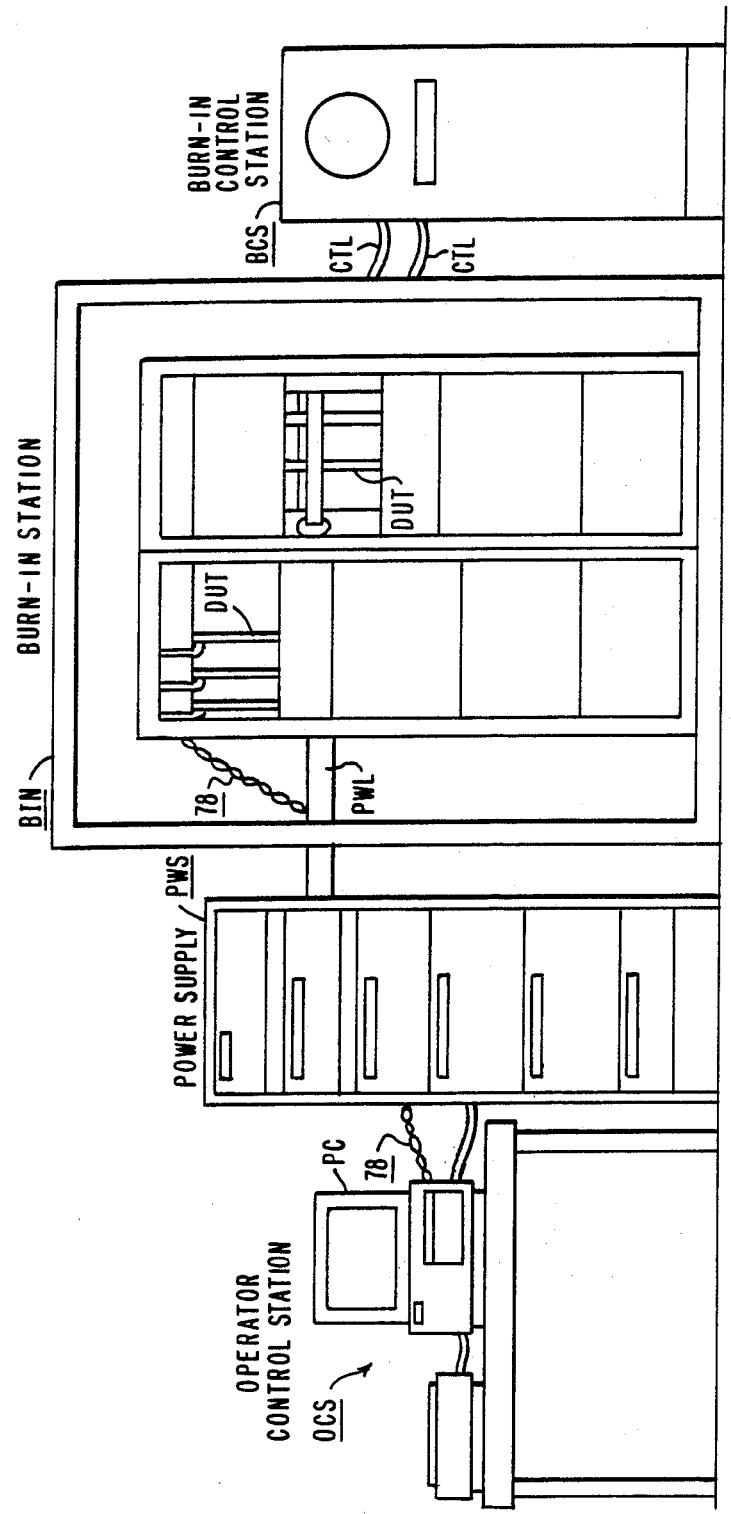
FIG. 3 illustrates a burn-in installation according to the scheme of FIG. 2.

Referring to FIG. 3 the overall installation is shown illustratively with its operator control station OCS and its burn-in station BIS. A power supply PWS is associated with the stations, having a power line PWL connected to the systems under test within the burn-in station. A burn-in control station is also associated with the installation so as to regulate the burn-in parameters. The operator has direct access with all the parts of the installation, placing or retrieving DUT's, controlling the process and the stresses applied to the DUT's within the chamber. The PC computer is operated close-by for control, data retrieving and monitoring of the burn-in process throughout the period.

Figure 4:
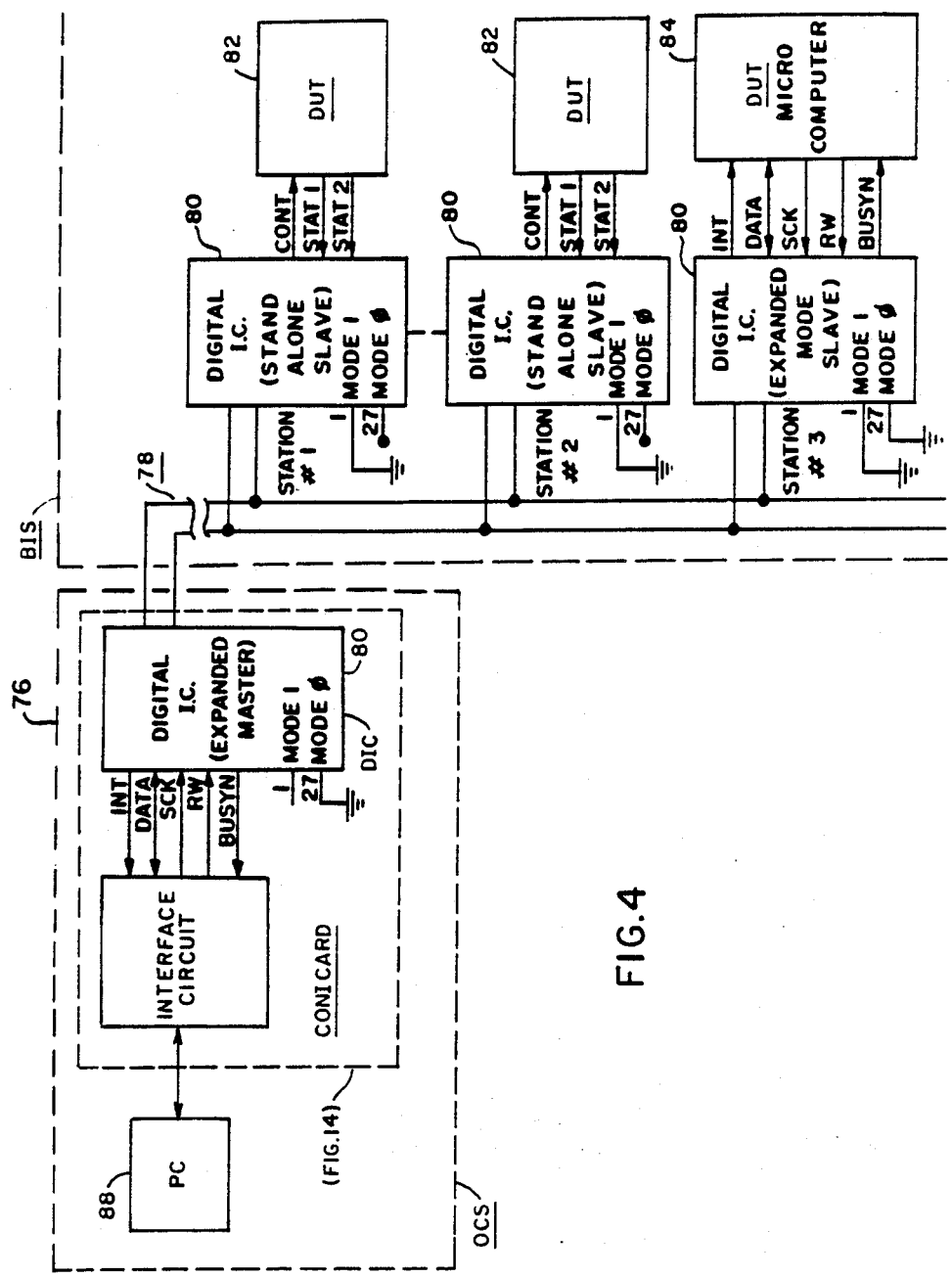
FIG. 4 is a block diagram showing the line of communication (INCOM) between DUT devices under test within the burn-in station and the PC computer at the operator station.

Referring to FIG. 4, a block diagram shows DUT's within the burn-in chamber being tested. Illustratively, two DUT's are shown at 92 (stations #1 and #2) in a stand alone slave situation, and a third DUT is shown at 84 (station #3) in an expanded mode slave situation.

The DUT in a stand alone slave situation may be a flip-flop, a PROM, a RAM, a buffer, a gate, a latch, . . . namely a logical device, or a combination of logical devices, which may assume a predetermined status, store data, transfer data, or change status, all situations which the operator from the operator station with the help of the PC computer is capable of monitoring, checking, controlling or retrieving, in order to ascertain whether the components are behaving as expected during burn-in and should be replaced, or repaired, and whether the overall system has reached a successful failure-free testing.

The DUT in an expanded slave mode situation is locally under the supervision of a local microcomputer. Digital operation is being performed continuously and locally by the microcomputer, and such operation involves the DUT. The microcomputer may also be part of the DUT itself under scrutiny.

The operator with the PC computer interrogates the slaves. In the slave alone situation commands may be sent through the INCOM line upon interrogation which may be to control or to return data. For instance a flip-flop may be called to be set and reset, or the latch device will be controlled to latch outstanding data. Else, a RAM will be addressed to contain specific data. The PC computer will also interrogate the stand alone DUT to send back through the INCOM the stored data, the present status,. . . In an expanded slave mode, an interrupt from the INCOM will open for the operator a window to check the operation which is running continuously between two interrupts. Again, there will be either control of data retrieval.

In all instances, detection of fault is in order. For instance, with a local microcomputer supervision of the DUT, the local system will be able to compare, via buffers and/or RAM devices, whether the DUT has status, or data, which match the reference. A correct, or a faulty result, will cause a logic signal to be sent back through the INCOM to the PC computer.

FIG. 4 shows as a block diagram the control and monitoring network, including an operator control station OCS at 76, which is used to transmit messages to and receive messages from a large number of remote DUT devices, or systems, located within a burn-in chamber BIS over a line of communication illustrated at 78. The line of communication will be referred hereinafter as the INCOM, and it has been described fully in the afore-stated incorporated by reference U.S. patents. The INCOM establishes a two-way communication between a PC computer and the grouped DUT's within the burn-in station BIS. The INCOM includes digital IC devices 80, one at the operator control station OCS end and one at each point of connection from line 78 to one DUT device under test. The digital IC device 80 which is within the operator control station OCS is interfaced with the PC computer by an interface circuit. The combination of device 80 and the interface circuit are the key elements, together with a transceiver unit, all in a CONI card which is described hereinafter in connection with FIG. 14, and as explained fully in the two incorporated by reference U.S. patent applications.

Within the burn-in station BIS two DUT devices are shown at 82 in the situation of a stand alone slave and a third DUT device is shown at 84 in an expanded mode slave. As explained hereinafter, with a 33-bit message format, the INCOM network will permit a two-way communication between the PC computer at the OCS station and as many as 4,096 stand alone slaves in the burn-in station BIS.

The IC device 80 is conceived as a versatile and readily adaptable device, suitable for different modes of operation by simply establishing different connections to two of its external pins. Thus, the digital IC device 80 within the OCS station will operate in the expanded master mode, the ones associated with DUT devices 82 within the BIS station will be in the stand alone slave mode, and the digital IC device 80 coupled to DUT device 84 will be in the expanded slave mode.

In terms of the INCOM network, the DUT devices 82 are totally passive. They are interrogated by the PC computer from line 78 with instructions either to obey a control i.e. change its status, or stored data (in which case the instruction will be called a "control" instruction), or to provide a reading acknowledging the present status or data (in which case the instruction will be called a "data" instruction) The DUT device in the stand alone slave situation may be a Flip-Flop, a Buffer, a RAM, a ROM, a Gate, a Latch, all products taken out of production which should keep under the burn-in process their inherent characteristics. For instance a Flip-Flop should be able to be SET or RESET at will, a Gate should be ENABLED or DISABLED at will. Accordingly, the operator, with the help of the PC computer, will send a COMMAND WORD, or a DATA Word according to the need. In contrast, the DUT device operating in the expanded slave mode will be continuously working under the supervision and control of a local microcomputer, thus, in the real world while being under burn-in testing in the BIS station. It is observed in this respect that the microcomputer may be part of the DUT. As seen from the OCS station, the INCOM, i.e. the communication network as controlled by the PC computer will interrupt the operation of the DUT device and interrogate the "system". Not only the DUT through the microcomputer will do whatever is required, but also it will let the OCS station know what is going on in the "system" at the BIS station.

Referring again to the digital IC device 80 as shown at the remote stations #1 and #2, the pin is configured to operate in the stand alone mode, and it sends a control output signal (CONT) to DUT device 82. The digital IC device 80 will also respond to a command from the OCS station by transmitting a message back over line 78 in accordance with the status of two terminals associated with the controlled device 82 identified as STAT 1 and STAT 2. Each of the digital IC's 80 is provided with a 12-bit address field so that as many as 4,096 of the devices 80 may be individually associated with a corresponding DUT device like at 82. Commands are transmitted over line 78 by appropriately changing the logic on its CONT line to the controlled device 82.

When configured in the expanded slave mode as when associated with DUT device 84, the digital IC 80 is arranged to respond to a particular command from the OCS station by establishing an interface with the associated microcomputer (which might be the DUT itself). The digital IC 80 responds to an enable interface instruction which is part of a message received from the PC computer and produces an interrupt signal on the INT line to the microcomputer which is associated to or is the DUT device 84 itself. Accordingly, the microcomputer will be able to read serial data out of a buffer shift register within the digital IC 80 over the bi-directional DATA line in response to serial clock pulses transmitted over the SCK line from the microcomputer 84 to the digital IC 80. Conversely, the digital IC 80 is capable of responding to a signal on the read write line RW from the microcomputer 84 by loading serial data into the buffer shift register of device 80 from the DATA line in coordination with serial clock pulses derived over the SCK line from the microcomputer 84. Then, the digital IC 80 will respond to a logic change on the RW line from the microcomputer 84 by incorporating the data supplied thereto in a 33-bit message formatted to include all of the protocol of a standard message transmitted by the PC computer at 76. This message, in the correct format, is transmitted by the IC 80 over line 78 to the OCS station. As a result, the expanded slave mode conformed IC device 80 enables bi-directional communication and transfer of data between the two remote stations in response to a specific enable interface instruction initially transmitted to the expanded slave device from the PC computer. Once the interface has been established between devices 80 and 84, it remains in effect until a message has been received by the IC device 80 from the PC computer, which message either contains a disable interface instruction, or a command addressed to a different DUT station. In either case, the interface between line 78 and the microcomputer related to DUT 84 remains disabled until another message has been received at the station including an enable interface instruction. The local IC 80 device also sends a busy signal over line BUSY to the associated microcomputer 84 whenever message is being transmitted, or received, on the other side i.e. line 78. The BUSY signal tells the microcomputer that a message is being placed on line 78 by the PC computer, even though control of the buffer shift register within the local IC 80 device has been shifted to the associated microcomputer 84.

Figures 5A, 5B:
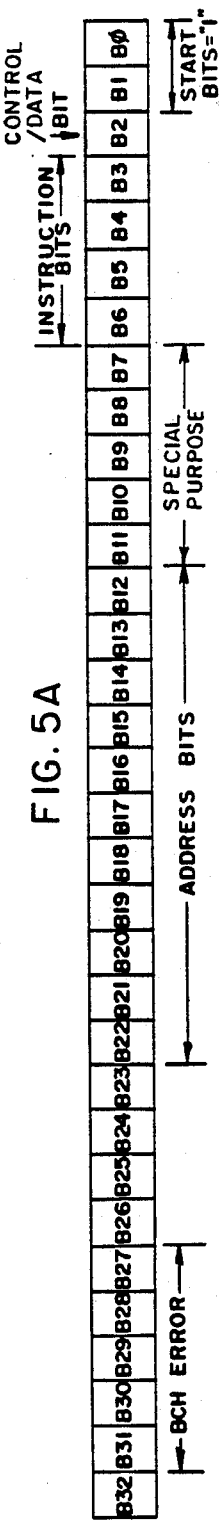
FIG. 5A shows a message bit format as may be employed in the system of FIG. 4 for a message transmitted from the operator control station to the burn-in station in the instance of a stand alone slave DUT.
FIG. 5B shows the coding of the instruction bits in the message of FIG. 5A in the instance where the DUT illustratively is a flip-flop device.

All communications on line 78 are, preferably, asynchronous in nature. FIGS. 5A, 6 and 7 illustrate the format of a 33-bit message for a general application as received by the remote station (FIG. 5A) and as sent back therefrom (FIG. 6) both in the stand alone slave situation, as well as the expanded slave received message (FIG. 7). Referring to FIG. 5A, the 33 bits B0–B32 are shown in the order they are stored in the shift register of the digital IC device 80, i.e. reading from right to left with the least significant bit on the extreme right. The 33-bit message of FIG. 5A begins with two start bits B0 and B1, it ends with one stop bit B32. The start bits are defined as logic ones "1" and the stop bit is defined as a logic "0". Typically, in the communication and control system a logic "1" is defined as carrier present, whereas a logic "0" is defined as an absence of carrier for any of the modulated carrier baud rates.

The next bit is B2. It is a control bit defining the meaning of the following message bits, namely B3–B26, which are referred to as buffer bits. A logic "1" for B2 is a control bit means that the buffer bits contain an address and an instruction for the digital IC 80 in either the stand alone slave or the expanded slave configuration. A logic "0" control bit B2 means that the buffer bits B3–B26 contain data intended for an interfaced microcomputer such as 84 of FIG. 4.

Bits B3–B6 that follow bit B2 are instruction bits if, and only if, the preceding control bit is a "1". The instruction bits B3–B6 are decoded to give a number of different instructions to the digital IC 80 device when operated in a stand alone slave mode or in an expanded slave mode. A relationship between the instruction bits B3–B6 and the corresponding instruction is given in FIG. 5B for illustration.

Assuming a stand alone slave mode, the DUT device being a Flip-Flop to be SET or RESET, if all the instructions are a "0", (000) a SET instruction is in order and the digital IC 80 resets its COUT pin which goes to logic zero and device 82 is SET. If B6 is a "1", the digital IC 80 device will return to the PC computer information regarding the status of lines STAT 1 and STAT 2 as derived from the DUT device 82.

When instruction bits B3–B6 are (100), a RESET instruction is decoded and digital IC 80 sets its COUT pin to a logic "1" which is applied to the controlled DUT device, the Flip-Flop. Here again, a "1" in the B6 bit tells the digital IC device 80 to transmit back status information regarding the controlled DUT device, thereby indicating that the command has been carried out.

When B3–B6 are (110), an enable interface instruction is decoded instructing an expanded slave device, like 84 in station 3 in FIG. 4, to establish an interface with the DUT (namely the microcomputer 84 or via the microcomputer) The digital IC device 80 responds to such enable interface instruction by reproducing an interrupt signal on the INT line after it has received a message containing the enable interface instruction from the PC computer.

Conversely, an instruction (010) tells the digital IC device 80 to disable the interface to the microcomputer 84 so that it cannot communicate over line 78 until another enable interface instruction has been received from the PC computer. Upon a disable interface instruction, a "1" present on B6 indicates that the expanded slave configured digital IC device 80 should transmit a reply to the PC computer confirming that the microcomputer interface has been effectively disabled by the local device 80. The B6 bit for an enable interface instruction is always zero to make sure that the local digital IC device 80 will not send back to the PC computer data intended solely for the local microcomputer 84.

When bits B3–B5 are (001), a BLOCK SET instruction is decoded, which is intended for stand alone slaves. When it is received, the stand alone slave will ignore the four least significant bits of its address and execute a SET operation. Accordingly, the BLOCK SET instruction permits the PC computer with a single transmitted message to simultaneously control sixteen FLIP-FLOP's.

In a similar manner, when B3–B5 are (101), a BLOCK RESET instruction is decoded which sixteen stand alone slaves can simultaneously interpret as a command to be RESET.

If B3–B5 are (011), a scram instruction is decoded. Accordingly, all the stand alone slaves connected to line 78 will disregard their entire address and will execute a SET operation. Therefore, by transmitting a scram instruction, the PC computer can simultaneously control all 4,096 stand alone slaves in the event of an emergency. It will be noted that the scram instruction is effective only when B6 has a zero.

When B3–B5 is (111), a status instruction is decoded. The addressed stand alone slave (DUT 82) is not controlled, but merely transmits back status information to the PC computer.

When the received message is intended for a stand alone slave, i.e. the control bit is a "1", bits B10–B21 represent the address assigned to the particular stand alone slave. In this mode bits B7–B9 and B22–B26 are not used. If, however, the message is intended for an expanded mode slave, these bits may contain data which are to be used by the associated microcomputer of the DUT 84.

In FIG. 5A are shown bits B27–B31 containing a five-bit BCH error checking code. The 27 preceding bits are stored into the serial shift register of local device 80 which compares its computed BCH error code with the error code contained in bits B27–B31 of the received message. If any bits of the BCH error code developed within local device 80 do not agree with the corresponding bits of the error code contained in bits B27–B31 of the received message, an error in transmission is in order and the particular device 80 will ignore the message.

FIG. 6 shows the general format of a 33-bit message as transmitted back by a stand alone slave from the BIS station in response to a request for a reply in the received message, namely a "1" present in the B6 bit position. The stand alone slave reply message has the same format as the one of FIG. 5a except that bits B25 and B26 correspond here to the status indication on STAT 1 and STAT 2 lines as received from the DUT device 82. It is noted here that B25 and B26 were not used in the received message, so that, for the transmitted message back to the PC computer, another BCH error checking method is necessary. It is as follows. The stand alone slave configured device 80 recomputes a five bit BCH error code based on the first 27 bits of the reply message of FIG. 6, as they are being transmitted on line 78. At the end of the 27th bit of the reply message, such recomputed BCH error code based on the status bits B25 and B26, is added to the transmitted message and a stop bit "0" is added to complete the reply message to the PC computer.

FIG. 7 shows the format of a second message transmitted by the PC computer to a digital IC device 80 configured for the expanded slave mode under the assumption, as stated earlier, that the first message included an enable interface. Typically, FIG. 7 shows a control bit which is "0", thus, thereby informing all of the other local devices 80 along line 78 that the message does not contain any address and control instruction. The next 24 bits comprise data to be read out from the buffer shift register within the particular local device 80 by the associated microcomputer 84.

Referring to FIGS. 8A, 8B, and 9, a specific example is now given of a stand alone slave DUT in communication with the PC computer via the local INCOM Interface, or digital IC device 80. The PC computer procedure is as follows:

1/The PC computer through its CONI card (FIGS. 4 and 13) transmits the 33 bit data word as shown with FIG. 5A to All INCOM Interface Units in loop (up to 4096) with addresses from 0 to FFFH.

2/In accordance with instructions the operator causes the 33-bit word to interrogate the INCOM Interface and perform the following functions: First, there is the the question regarding the Control bit: "Is this a command word, or a data word? The message of FIG. 8A shows (after the two Start bits on the right) the Control bit (a "1" for Control, a "0" for Data). If the conclusion is CONTROL, the question becomes: WHAT IS THE INSTRUCTION? Looking upon the Command Field (CF), as shown in FIG. 8A, the instruction bits are (0011=3), meaning ENABLE for the particular DUT. Then, there is a Subcommand Field (SCF), in this instance (0000=0). Finally, comes the Address (IQ) shown as all 0 for Unit 0. Following the Instruction, the message has four bits not used, followed by five bits (00001) for a Block Check Character indicating whether all bits have been received as transmitted. The last bit is for STOP.

3/The INCOM Interface Unit "0" recognizes its address, accepts the command, interprets it and executes it (ENABLE the DUT).

4/Unit "0" returns an acknowledgment of reception.

5/The PC computer operator is now in a position to ask for a status of a DUT. The reply message shown in FIG. 8B has (0111=7) for the Command Field (CF), has (000) for the Subcommand Field (SCF) and ("0" for the Address Field (IQ), illustratively. This definition is for "Request Status of Unit 0".

The DUT returns an acknowledgment of request, a status (OK, or Unit unavailable, . . .) and a "Ready for Next Transmission" bit. This tells the overall status of the Unit for a snapshot look at the DUT. For a more precise information, it will be possible to compare the status against limits, or the particular contents of a buffer may be requested. For more sophistication in communication, hexadecimal can be used instead of binary.

Figure 10:
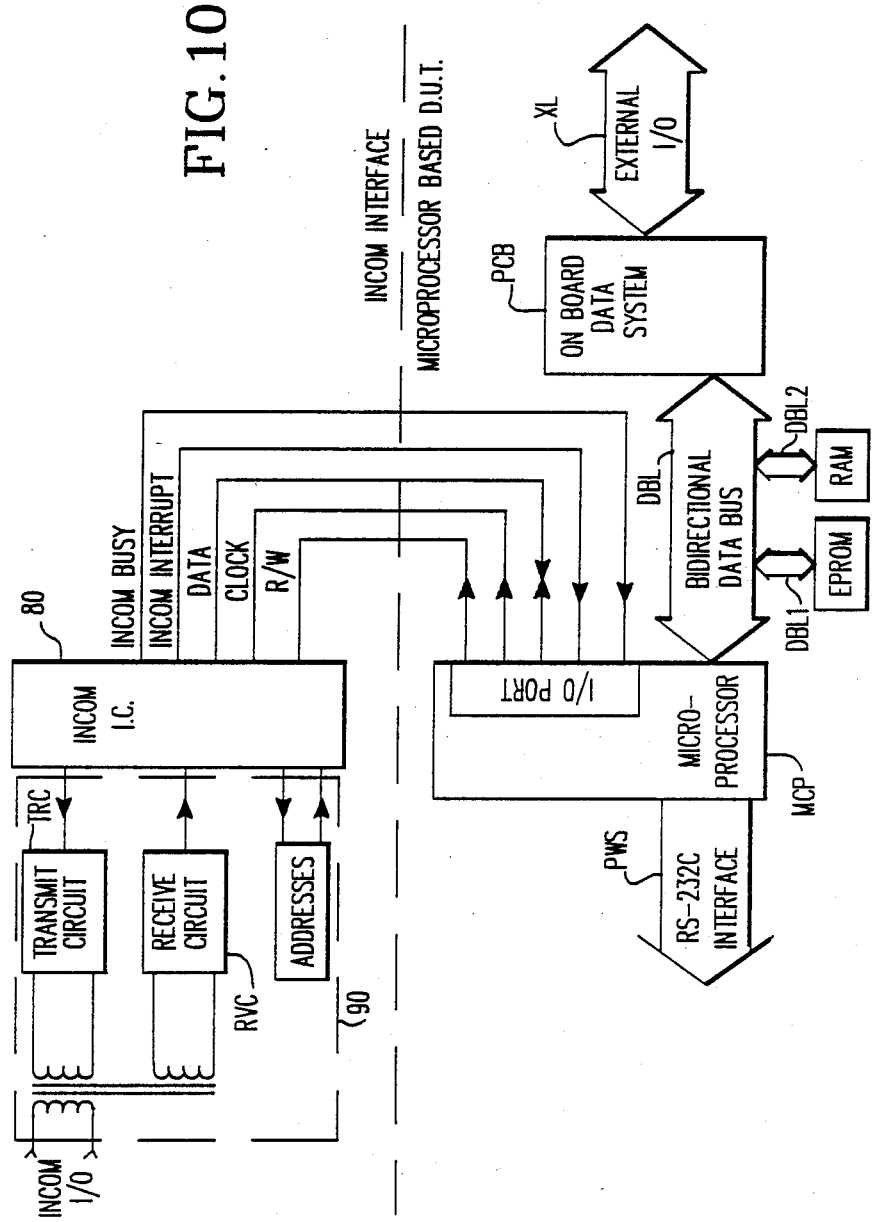
FIG. 10 shows, in block diagram the insertion of a printed circuit board with a microprocessor in the burn-in chamber, the DUT being connected so as to supply data acquisition from its own environment.

FIG. 9 is a message containing data in ASCii language, having typically "happy faces" to mark the end of a message portion. FIG. 9 relates to the block diagram of FIG. 10. FIG. 10 in the situation of an expanded slave mode assumes that the DUT is a printed circuit board PCB as the DUT device under test. There is a bi-directional communication locally between the associated microcomputer MCP, via data bus lines DBL which communicate bidirectionally with an EPROM and a RAM by busses DBL1 and DBL2, respectively. The microcomputer is supplied electrically with its own power supply (controlled by a typical RS-232C Interface supply line) to the power supply PWS (FIG. 3). Through the usual I/O port the microcomputer communicates with the INCOM IC 80 associated to it locally. The lines, as earlier stated, are BUSY, INT, DATA, SCK and RW (FIG. 4). Device 80 in turn communicates with line 78 through respective "transmit and "receive" circuits (TRC and RVC) and a coupling network. The DUT unit is connected with an external circuit as in real life, with I/O lines (XL), for instance. Like in the instance of FIG. 8A, the PC computer will follow the procedure 1/COM/Data (1)?; 2/what are CF,SCF,IQ? 3/assuming 0, 4, 0 is the response, the code will be, for instance, "send the contents of Buffer 0". Accordingly, as shown in FIG. 10, the test could be on a PROM via lines DBL, DBL1 and DBL2 to retrieve data from the DUT (the PROM) put them in the EPROM and compare them with the RAM reference data. The microcomputer will detect whether there is a match: OK, or FAILURE. The DUT (namely the microcomputer) will return data in ASCii as shown in FIG. 9. In this example, eleven (11) messages are transmitted. Each message is separated by an ASCii "happy face" indicating end of file. When data are to be collected and compared, the data, or tolerances will, be first burned into the PROM from which they will be retrieved and set into the RAM used by the computer with the DUT data for comparison purpose. The decision to pass, or fail a DUT may be assigned to the local microcomputer, or to the central PC computer.

Figure 11:
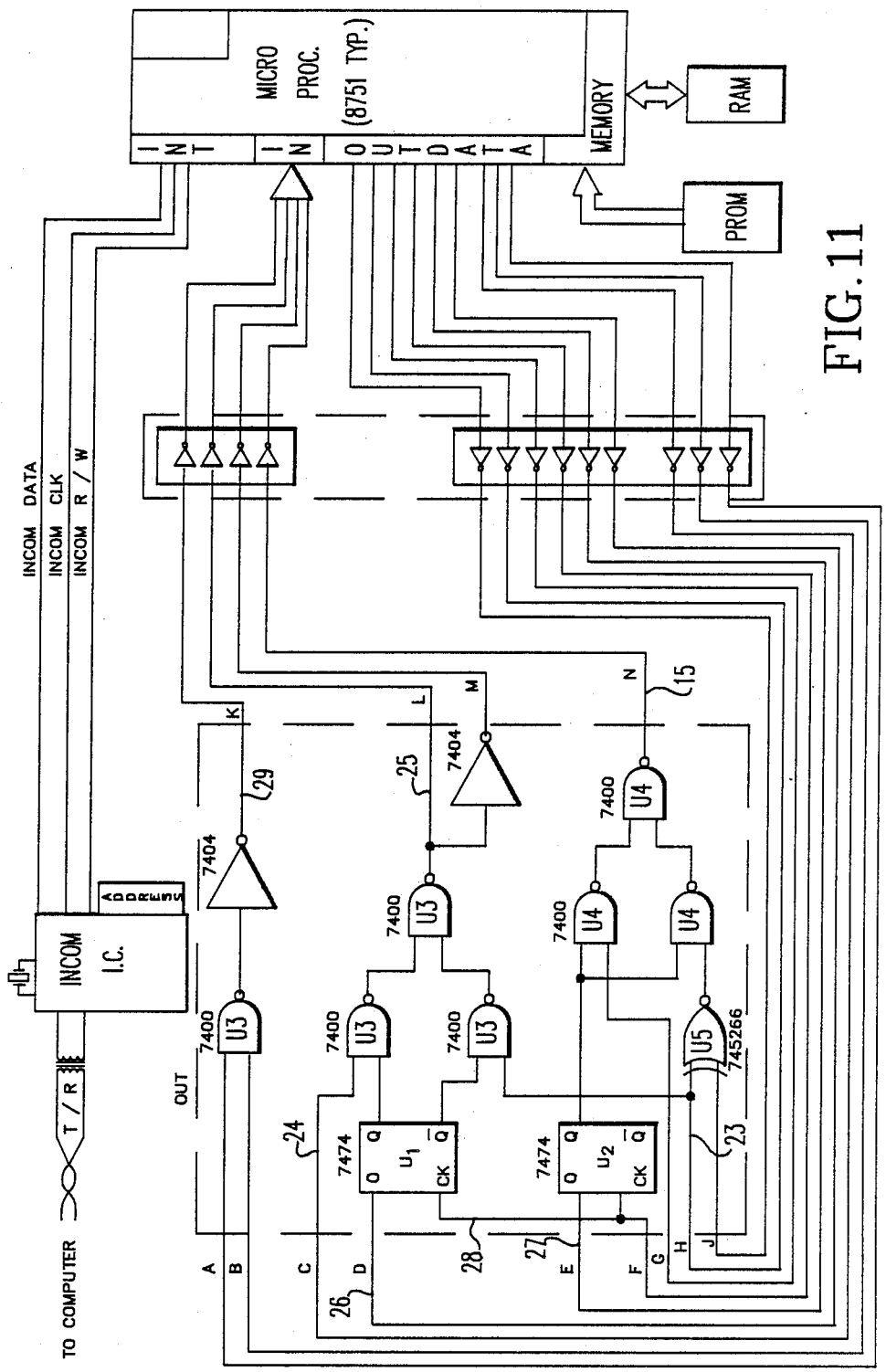
FIG. 11 is illustrative of a PC board being tested and of an occurring failure of an on-board component thereof.

FIG. 11 shows a specific application where the DUT inserted for operation with the local microcomputer is an "error sign logic" taken from FIG. 9B of U.S. Pat. No. 3,967,176 used in the comparison of logic signals received on lines 26,27,28. Two operational inputs A and B are logically compared to derive A<B on line 26, A=B on line 27 and A>B on line 28. Devices U1 and U2 interpret the logic at these inputs. Their outputs, as well as sign signals appearing on lines 24, and 23 are interpreted by the error sign logic circuit. The error sign logic evaluates all the possible combinations between inequality and sign, so as to derive control outputs on line 29 (allowing operation), on line 15 (stopping the operation) and on line 25 (determining the direction of the operation). The error sign logic circuit is tested as a DUT in the burn-in chamber for its correct logic quality, which depends upon all the inputs and/or outputs of each of the solid state components within the device. Therefore, input lines A through J from the microcomputer are used to feed data into the respective inputs of the DUT as shown, namely as derived from the external circuitry which stimulates (and acquires data) relating to the DUT. Also, output lines K through N are feeding into the microcomputer and from there to the external circuitry (which also stimulates the DUT with data) logical data received from the outputs of the DUT. Again, a PROM is used by the microcomputer as a reference of the correct relationship between inputs and outputs of the DUT. A RAM is used to be loaded with the reference data from the PROM and the microcomputer effectuates with operative data from the DUT a comparison which tells whether the microcomputer can detect a match or a mismatch. The results are, again, passed to the associated device 80 by lines DATA, SCK and RW, as earlier stated. The table of truth of the PROM is shown in FIG. 12. It reveals that for lines K, L, M, the conclusion is (C) for CORRECT, whereas for line N the conclusion is (W) for WRONG. This is due to solid state device U4 failing (as marked X in the Figure) where it responds to the Q output of device U2.

The sequence followed by the system is as follows:

1/The test steps are burned into the test PROM of the microcomputer for the purpose of dynamic testing during Burn-IN.

2/On power-up in the burn-in, all the circuits are reset and the microcomputer passes all the PROM instructions into the RAM.

3/The instructions of the RAM are executed by the processor with the DUT.

4/The outputs of the DUT are received by the processor and compared against the expected parameters that the PROM has placed into the RAM.

5/If all the comparison tests are "correct", the processor sends a message back to the PC computer via the INCOM line 78.

6/Then, the PC computer goes to the "next" address for another DUT, and the steps 1 through 5 are repeated.

7/If the comparison at step 5 is "not correct", a message is sent to this effect to the PC computer (Failure).

8/The PC computer records the DUT type, Serial Number, Time of the Day, Date and Test Step having failed (if possible), onto a disk file and there is a print out made of the data for the operator intervention.

9/Unless the operator intervenes, the computer increments the address and the process continues toward the "next" DUT under test.

In the preceding description the digital INCOM interface device 80 has been quoted and considered by reference to FIG. 4 in the preferred embodiment. The overall interfacing circuitry appears in fact as a CONI card (see FIGS. 4 and 14) between the PC computer and the communication line 78, and as a PONY card inserted between the local DUT, or local microcomputer, and the branching point of the daisy-line 78 (FIG. 2). Instead of a PONY card, the system may use a MEI card, or any other standard card for that purpose. The MEI card has an advantage in that it requires only an RS-232 Interface. Communication with the microcomputer may be through the Intel 8085 and the 8051 family (8751 and 8031). More generally, the dynamic burn-in system, according to the present invention, can be installed (instead of with the INCOM according to the incorporated by reference U.S. patents and patent applications) with an RS-232, for instance. It applies to dynamic testing of multiple product types simultaneously conducted. This is in contrast with the marketed systems which consist of pieces of commercially available equipment tied together over a IEEE-488 Bus, with little or no data logging capability. The dynamic burn-in system uses an IBM-PC (model XT, AT, or a ClONE thereof) with a CONI card installed in the PC expansion card slot. Attached to the CONI card through a two-wire interface (in the preferred embodiment just described) is a local INCOM-based slave Interface (device 80) in the form of a PONY card, MEI card, . . . which can communicate with the associated DUT. The dynamic burn-in system uses a user-friendly communications software for ease of programming and for interactive data monitoring, communications and data logging.

The main program is a program written preferably in BASIC for ease of understanding by the operator. The program accepts inputs from the operator at the OCS station. It relates to a series of questions which facilitate the configuration to a burn-in process. Once the questions are answered, the software calls the proper subroutines to exercise the product being tested. These subroutines may be written for specific products, or can be made for general use. The software can lengthen the duration of the tests should the operator want to pursue testing after an error (product failure), or a system failure (power failure). Once the master program has been compiled, it can be executed and will begin testing the products in the order of the listing.

If an error occurs during a testing cycle, the microprocessor is notified and the PONY card communicates the failure to the CONI card through line 78. The PC computer prints out the values of all measured parameters and flags the parameters that are out of tolerance. If the operator requests "HALT ON ERROR", the system will store the address of the product that failed, the time of the day, and the parameter that failed. That product can then be repaired and rerun for a separate time with all the other products until it completes its 24-hour burn-in cycle. The failed date is not only printed out at the time of failure, it is also stored on the disk. The entire "Health" of the product(s) is stored on disk every hour automatically. All parameters are displayed on the screen of the PC computer during the test of any given product, along with the product type and address (location) of the product. The INCOM burn-in system can supply information regarding:

1/QUICK-STATUS at a Supervisory level is given by the software a/the response status is given of the interface which allows the operator to troubleshoot a problem in the interface of the DUT, or b/by pressing a function key (F1–F10) on the keyboard, the status of the individual DUT's in the Burn-In system is acquired;

2/All the parameters of a particular DUT are monitored;

3/Even though the system's primary function is to monitor one DUT at a time, the operator can alter the scanning sequence to monitor one DUT continuously.

The on-board microprocessor is better qualified to interrogate its own I/O than any outside computer. The firm-ware programmed into the microcomputer or the PROM's thereof, can be either special test software, or the actual operating software so as to simulate real world environment. Accordingly, the only function for the outside computer, namely the PC computer, is to monitor data from the individual DUT's. One can add an ADDRESSABLE RELAY. In such case, all the interface devices controlled by a 192-bit serial stream, will have an additional stimulus and response to turned them On/Off, or to manipulate them from the operator display. This is advantageous where dynamic tests are performed requiring more than the presence or absence of a signal.

Typically, so many products are positioned in dedicated racks for ease of power supply connections and stimulus. The onboard microcomputer will monitor so many parameters, store the information in a buffer awaiting interrogation by the PC computer via the INCOM network for a large total of printed circuit boards, for instance.

In APPENDIX are provided partial computer listings of three products identified as XXXXXXX, YYY-YYYY, and ZZZZZZ, in order to illustrate the ease of programming subprograms.

Figure 13:
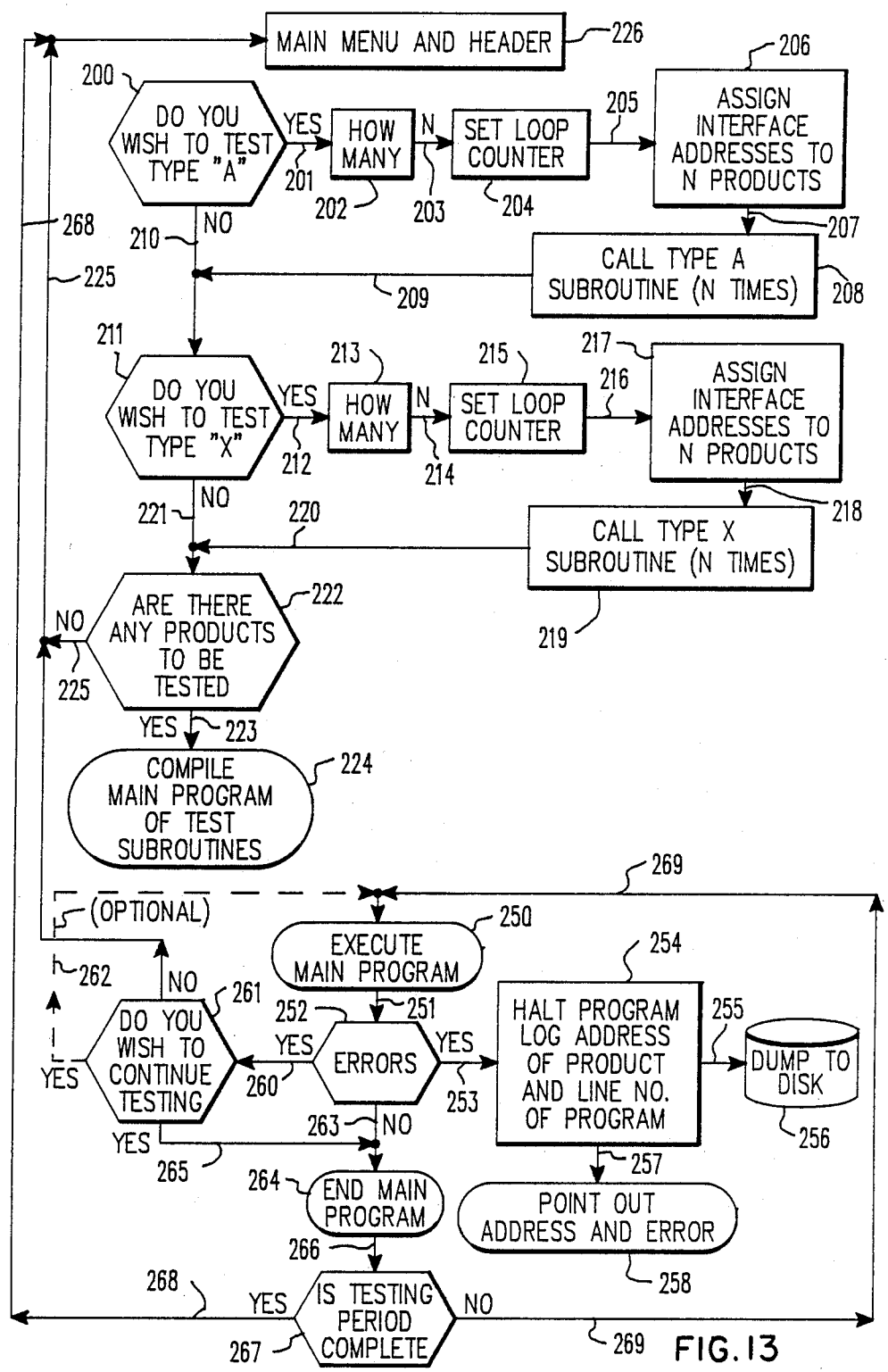
FIG. 13 is a flow chart illustrating the operation of the system according to the invention under control and monitoring by the operator from the PC computer in the operator control station of the DUT's in the burn-in chamber.

Referring to FIG. 13, a flow chart indicates the steps followed by the operator in the operator control 3 station OCS when monitoring and controlling DUT's under test in the burn-in chamber BIS. At 200 the question is whether testing of type A is to be done. If YES at 201, the system goes at 202 where the question is "How many?". From there, with the number N on line 103, the system goes at 204 where the loop counter is set for that number. By 205 to 208 the operation is to assign interface addresses to the N products. Accordingly, by 207 at block 208 the type A subroutine is called N times, returning by 209 to the next procedure on line 210. If there is a NO to the question of block 200, the system by line 210 goes to block 211 where the question is "Do you wish to test type X?". A loop similar to the just described loop for type A is now in order. Upon a YES to the question at 211, by 212 block 213 will seek to know the number N of DUT's for that particular type X. Addresses are assigned at 217 and, by 218, at block 119 the type X subroutines are called for. From 219, by line 220, the system returns to the main line 221 which also corresponds to a NO at 211. If at 222 the response to the question is that there are more products to be tested, by line 223 the system goes to 124 where the main program is compiled for test subroutines. If the answer at 222 is NO, by line 225 there is a return to the main menu and header at 226.

The main program is executed from block 250 upon which, by line 251, at 252 the question is whether there are ERRORS? If there are NONE, by line 263 the system goes to 264 where the main program is ended. From there, at 267 the question is whether the testing period is complete. If the answer is NO the system goes back by line 269 to block 250 to execute the main program. If the answer at 267 was YES, by line 268 the system goes back to the main menu and header at 226. If there is a YES at 252, meaning that there are ERRORS, by 253 the system will at 254 require to HALT the program log address of the product and line No of the program, which data will, by line 255, be caused to be dumped to the disk at 256. At the same time, from 252, the question will be at 261 whether to continue testing. There is here an option by line 262 to return to the main program. Otherwise, by line 268 the system goes to the main menu and header at 226.

From FIG. 14 to FIG. 32 will now be described the essential features of the INCOM network establishing a two-way communication between the operator control station OCS and the DUT's under test within the burn-in chamber BSI. A more detailed description is to be found in the incorporated by reference U.S. patents and patent applications.

Figure 14:
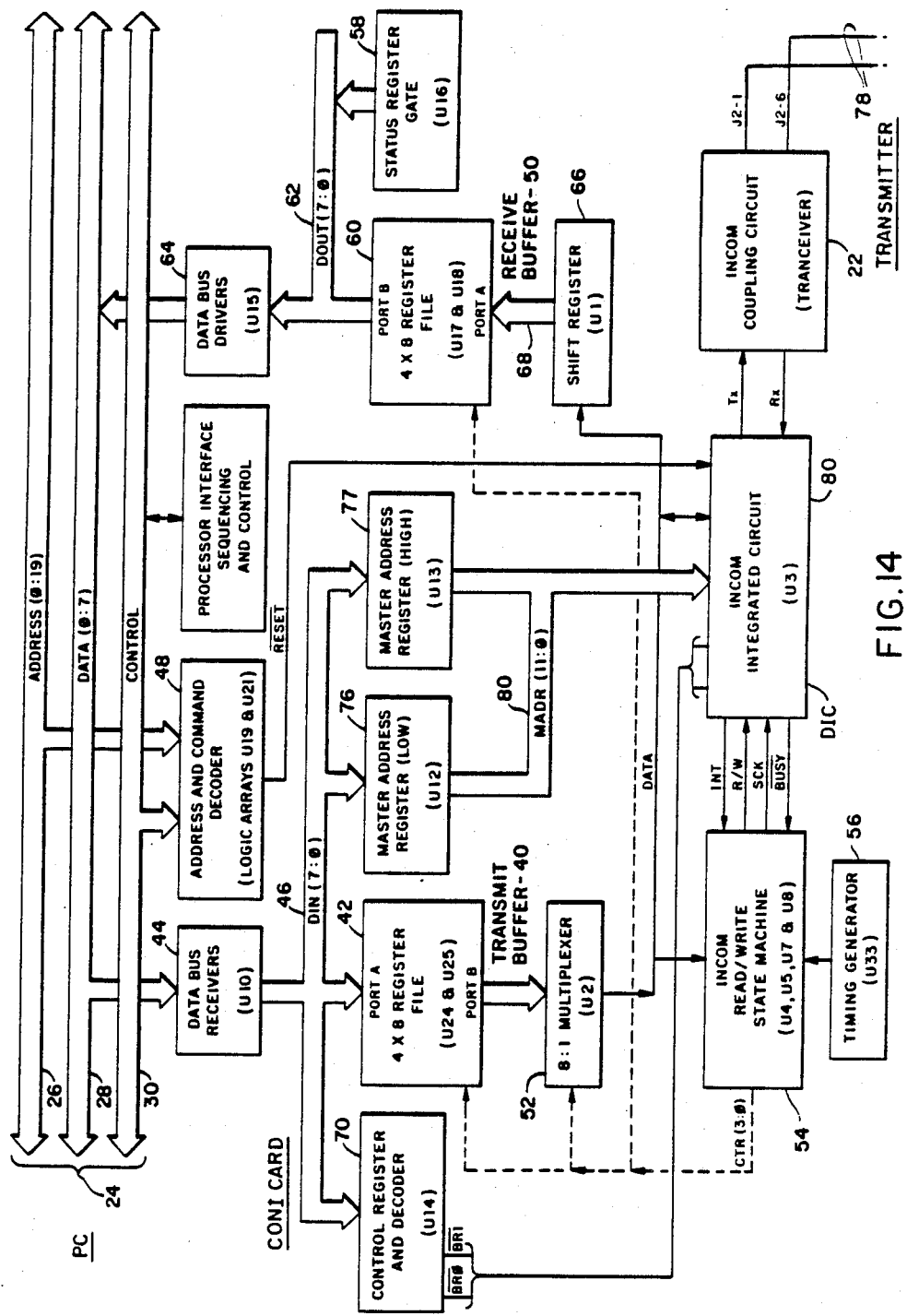
FIG. 14 overall block diagram of the interface circuitry between the PC computer and the transmission line (INCOM) in the preferred embodiment of the present invention.

FIG. 14 shows the hardware interface between the PC computer and the communication line 78, generally referred to as a CONI card. Within the CONI card has been placed the digital Interface device 80 in the form of a chip U3, referred to hereinafter as the INCOM chip. The CONI card also includes a receive buffer register (50) into which the contents of the INCOM shift register, namely within the associated digital interface device 80 (U3), may be rapidly loaded so that the first bit of the succeeding message on the INCOM network will not be lost. An interrupt signal is, then, sent to the processor of the PC computer over busses 24, indicating that a received message has been stored in the interface which can be read out. The PC computer will respond to the interrupt signal and read the message from the receive buffer 50 at any time during the next 33 bit message. After the receive buffer 50 has read the first stored message, a control signal is sent to release the receive buffer 50 for storage of the next message coming from the communication line 78. The CONI card also includes a transmit buffer register (40) into which the PC computer is able to write a message intended for transmission over line 78. In this case, an initial transmit signal is sent from the PC computer causing, via busses 24, serializing of the message written into the transmit register 40 and loading it into the shift register of the INCOM chip U3, or digital Interface device 80. During this period, the hardware interface generates a status signal which can be read by the PC computer, thereby not to load another message into the transmit buffer 40 while the first message is being read out and loaded into device 80. As soon as this phase as been completed, an interrupt signal is sent to the PC computer in order to enable it to write a second message into the transmit buffer 40, while the first message is being transmitted by the INCOM device 80 over line 78. FIG. 14 also shows hardware logic synchronized with an internal timing generator (U33 at 56) and the interface signals from the INCOM device (U3 at 80) to perform a sequence of operations required to shift data out and load data into the shift register of INCOM chip U3.

It is observed that the INCOM chip U3 is connected to line 78 through a coupling circuit 22 and a connector J2 providing bidirectional coupling. In the alternative, the INCOM chip U3 may be connected to another line of communication, such as a fiber optic cable system.

Figure 15:
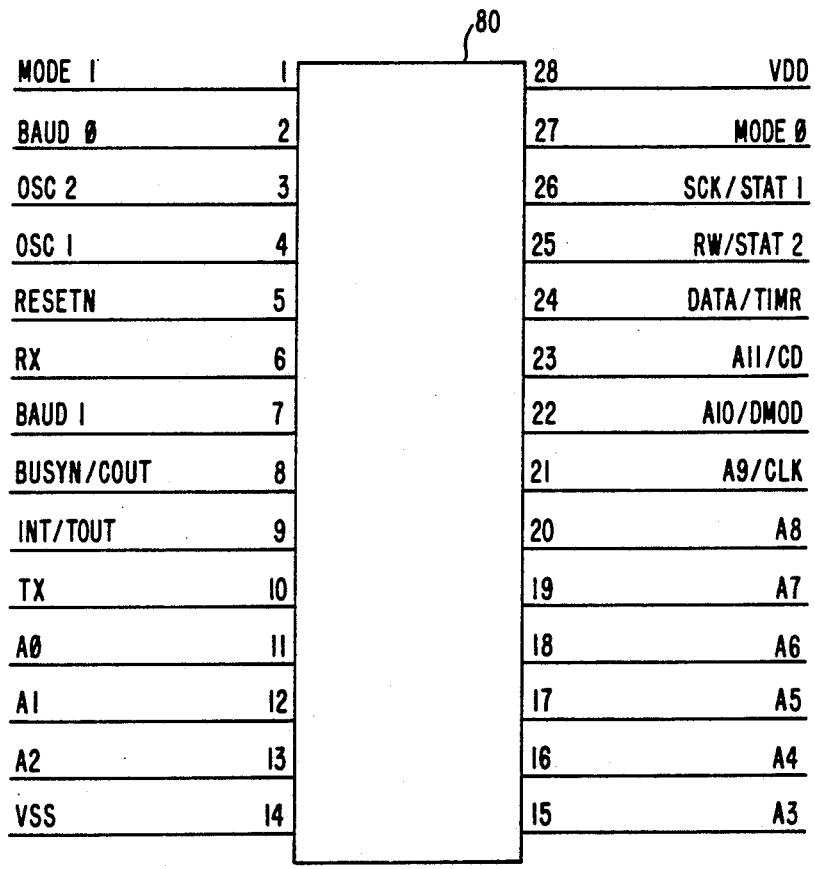
FIG. 15 is a diagram of the pin configuration of the digital INCOM integrated circuit used in the system according to FIG. 14.

The INCOM chip U3, as shown in FIG. 15, is a 28 pin CMOS semi-custom integrated circuit performing interface functions of address recognition, detection and storage of an On/Off keyed carrier multi-bit message received, carrier generation and transmission of an On/-Off keyed carrier message to the network with information stored therein, generation and checking of a cyclic error code (such as the BCH error code earlier mentioned), and framing of the received and transmitted messages to a specific format. The INCOM chip U3 is operated in the expanded master mode configuration, being associated with the PC computer.

All the components of the CONI card, including the U3 chip and the coupling circuit 22, are arranged on a printed circuit board, or card, which is plugged into one of the I/O slots on the PC computer processor busses 24, typically by means of the dual read-out 31/62 pin connector P1 which is a standard connector for busses 24 which include an address bus 26, a data bus 28 and a control bus 30. The CONI card is a slave on the PC computer, responding only to I/O read and write operations.

The coupling circuit 22 is a bidirectional transformer coupled circuit tuned to the INCOM carrier frequency of 115.2 kHz. This transformer isolates the INCOM network from the PC computer internal circuitry. It has a high potential rating of 2500 VAC and a 1 microsecond impulse rating of 6 kV peak. The network wiring 78 is also isolated by series capacitor rated at 0.01 mfd, 2%, 400 V.

In the transmit mode, the open circuit voltage across the INCOM network interface terminals J2-J1 is less than 30 volts RMS, dropping to 2.5 volts RMS with a 10 ohm resistive load. The short-circuit current is 100 milliamps RMS. The transmitter portion of the INCOM chip U3 and coupling circuit 22 can operate continuously.

In the receive mode, the input impedance of the CONI card interface, as seen from the J2 terminals, is 10 ohms at the carrier frequency of 115.2 kHz. The receiver sensitivity of the coupling circuit 22 and INCOM chip U3 is 10 millivolts at 115.2 kHz with a band-pass response centered on this frequency. The digital carrier detection circuitry within the INCOM chip U3 has a + or −1.5 kHz window.

The I/O registers on the CONI card include a transmit buffer 40 and a receive buffer register 50, each comprising a dual port register file accessed by both the PC computer busses 24 and the Conicard hardware. Buffer 40 is written only by the processor interface and is read only by the INCOM interface. Conversely, buffer 50 is written only by the processor interface, whereas it is read only by the processor interface.

The PC computer writes by placing data on data bus 28, which in turn apply data, through data receivers 44 to an internal data input bus 46 connected to port A of a register file 42. Register file 42 consists of four byte-wide write only registers accessed at I/O addresses. The processor also places a suitable input output address on the address lines 26 and an IOW signal on the control bus 30, decoded by the address and command decoder 48. The transmit buffer 40 is read from port B of the register file 42 by means of a multiplexer 52. The register file 42 and the multiplexer 52 are controlled during readout by an INCOM read/write state machine 54. The state machine 54 is controlled by a timing generator 56 and provides timed counter pulses CTR[3;0] to the register file 42 and the multiplexer 52. Messages are written into the transmit buffer 40 in the format of the INCOM communication network. The format of the transmit buffer provides for a control bit which designates a control or command message to be sent over line 78 to a stand alone slave or an enable-mode slave which includes the address of the slave, an INCOM instruction and other command data, as earlier explained. After an interface has been established between the expanded mode slave and the associated local microcomputer, the format of the slave is changed to permit communications back and forth also as earlier explained. So is it that, in the message, the I/O addresses contain data supplied from the PC computer processor, through the CONI card, over line 78 to the addressed expanded mode slave. The message which has been stored in the transmit buffer 40 is read from port B of the register file 42 by the multiplexer 52. The latter serializes the 8 bits of data available from each register and supplies individual data bits to the bidirectional DATA connected to the internal shift register within INCOM chip U3. Concurrently, the state machine 54 supplies serial clock pulses over SCK line to the clock input of the internal shift register (see FIG. 15).

Conversely, for the reception receive buffer 50 includes a register file 60 consisting of four byte-wide read-only registers accessed at I/O addresses. The PC computer reads any of the four registers by placing the corresponding I/O address on the address bus 26 and an input output write signal IOW on the control bus 30. The address and command decoder 48 decodes these signals and provides a bus gate pulse to the data bus drivers 64 connecting the internal data output bus 62 to the data bus 28 of the PC computer.

Each message received by the CONI card from the INCOM network is first loaded into the internal shift register of the INCOM chip U3. Then, U3 provides an interrupt signal on its INT line (FIG. 15) to the read write state machine 54 which responds by holding the read write (R/W) line high and supplying timed serial clock pulses over the SCK line, thereby to shift the stored message serially onto the bidirectional DATA line and, through the four bit shift register 66, to port A of the register file 60. The read write state machine 54 also controls the loading of data into register file 60 so as to enable the use of the four bit shift registers 66. As each of the four bits of the message stored in the INCOM chip U3 are shifted into register 66, they are supplied over the receive data bus 68 to port A of the register file 60. The read write state machine is, then, supplying suitable counter signals to the register file 62, thereby to enable the storage of the received message in the four bit wide registers of the register file 60.

The hardware interface CONI card also includes a control register 70 used by the PC computer to control this hardware interface. The control register 70 is connected to the internal data input bus 46 on the CONI card, allowing data placed on the data bus 28 by the PC computer to be written into register 70 through data bus receivers 44. It has assigned I/O address and may be written to by the PC computer by placing the desired data on data bus 28, the I/O address on the address bus 26 and an I/O write signal IOW on the control bus 30. The address and command decoder 48 decodes these address and control signals, while providing a gating signal to the control register 70. One bit 0 of the control register 70 is assigned to an initiate transmit signal. After the PC computer has written a message into the transmit buffer 40, it can produce an initiate transmit signal by writing a "1" in such bit zero (CR:0=1). The CONI card responds to the initiate transmit signal by in turn loading the message stored in the transmit buffer 40 into the internal shift register of the INCOM chip U3 and controlling the INCOM chip U3 over the R/W line so as to initiate transmission of the message stored onto the communication line 78. During the period that the message is being transferred to the internal shift register of INCOM chip U3, bit 1 of the status register 58 is set (SR:1=1), and during this period the CONI card ignores any initiate transmit signal from the PC computer. Writing a "0" in bit zero of the control register 70 has no effect.

Bit 1 of the control register 70 is an acknowledge receive signal. The processor produces it by writing the control register with bit 1 set (CR:1=1), after the PC computer has read the network message stored in the receive buffer 50. This informs the CONI card that the received message has been read and that the receive buffer 50 is available for storing the next network message from the INCOM chip U3. Writing a zero to bit 1 of the control register 70 will have no effect.

Figure 16:
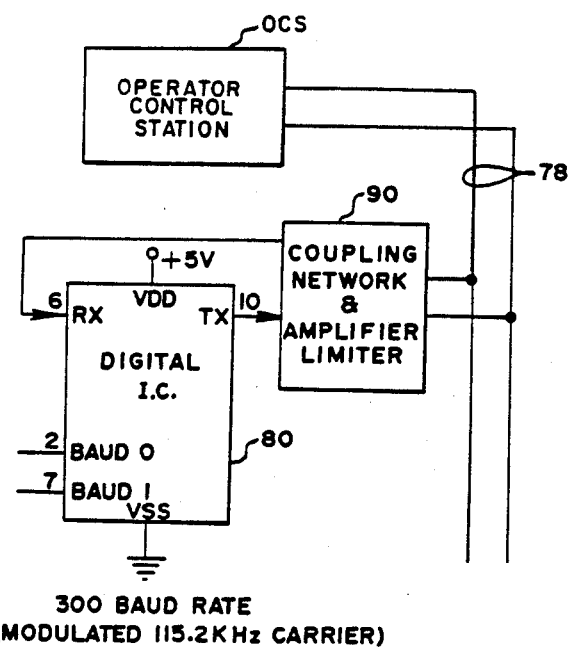
FIG. 16 illustratively shows in block diagram the use of the digital IC of FIG. 15 with a transmission line (INCOM) operated at a baud rate of 300.
Figure 18:
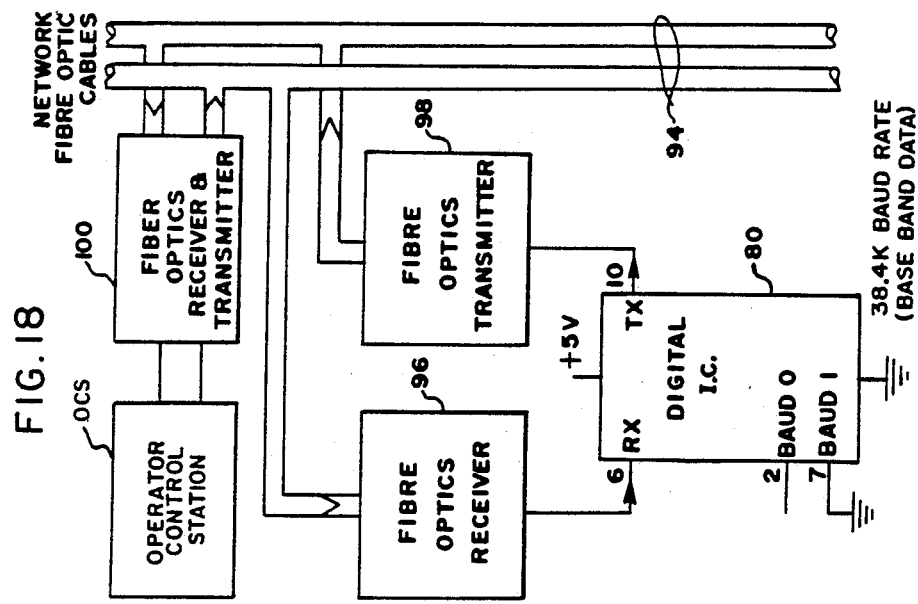
FIG. 18 illustratively shows in block diagram of the use of the digital IC of FIG. 15 in a fiber optic cable transmission at a 38.4 baud rate.
Figure 17:
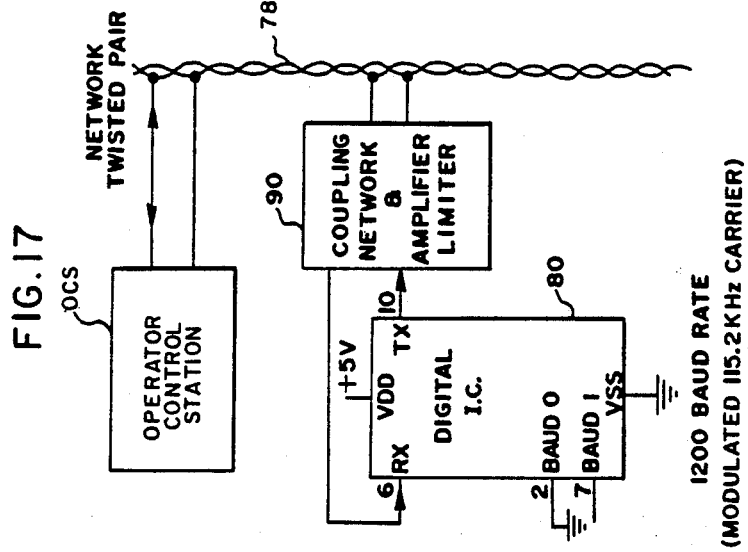
FIG. 17 illustratively shows in block diagram the use of the digital IC of FIG. 15 with a transmission line (INCOM) operated at a baud rate of 1200.

In order to permit the PC computer to control the baud rate at which the messages are transmitted and received by the INCOM chip U3, bits 6 and 7 of the control register 70 are designated as baud rate control bits. A logic 0 in bits 6 and 7 will leave the current baud rate unchanged. With CR:7,6 =11, the corresponding stages of the control register 70 supply control signals BR0 and BR1 to the INCOM chip U3 which cause it to operate at a baud rate of 300 Hz (FIG. 16). For a setting of CR:7,6=10, the chip U3 will operate at a baud rate of 1200 Hz (FIG. 17). For a setting of CR:7,6=01 the chip U3 will operate at the baud rate of 38.4 kHz (FIG. 18).

A status register 58 is used by the CONI card to inform the PC computer processor of the state of the CONI card. Status register 58 is read from the same I/O address at which the control register 70 is written to by the PC computer.

Bit 0 is used as a transmit sequence signal bit indicating the availability of the transmit buffer 40 to the PC computer. A logic 1 in bit 0 of the status register 58 (SR:O=1) indicates that the CONI card is transferring the contents of the transmit buffer 40 to the INCOM chip U3 for the transmission onto line 78. A logic zero in bit 0 (SRLO=0) indicates that the transmit buffer 40 is available for the PC computer. After reset, SR:O=0.

Bit 1 comprises an Rx control bit indicating the availability of the receive buffer 50 for the PC computer. A 1 in bit 1, (SR:1=1), indicates that the CONI card is transferring a message from the INCOM chip U3 to the receive buffer 50. A zero (SR:l=0) indicates that the buffer contains a valid message and that the PC computer may read the contents. After reset (SR:l=1) since no message has yet been recorded in the receive buffer 50.

Bit 2 comprises a transmitter interrupt request bit indicating the completion of the transfer of a message from the transmit buffer 40 to the INCOM chip U3, in response to an INIXMT signal from the PC computer. This bit is set (SR:2=1) after the contents of the transmit buffer 40 have been loaded into the INCOM chip U3 and the state machine 54 pulls the R/W line high in order to initiate transmission by the INCOM chip U3 over line 78. At the same time this bit is set, an interrupt request is placed on the IRQ3 line of the control bus 30 (pin B25 of connector P1). The transmitter interrupt request bit is cleared (SR:2=0) after the status read operation.

Bit 3 is a receiver interrupt request bit indicating that a message has been received from the INCOM network. This bit will be set (SR:3=1) after the receive buffer 50 has been loaded with the message received by the INCOM chip U3. At the same time an interrupt request is produced. This bit will be cleared (SR:3=0) after the status read operation.

Bits 5 and 4 of the status register 58 are baud rate status bits indicating the current baud rate. SR:5,4=01 indicates a baud rate of 38.4 kHz; SR:4,5=10 is for 1200 Hz and SR:5,4=11 means 300 Hz.

Bit 7 is the INCOM busy status bit.

The CONI card further includes master address registers 76 and 77, where the PC computer can write a desired address for the INCOM chip U3. They are addressed by the PC computer through data bus receivers 44 and an internal data input bus 46.

From the CONI card, the INCOM network (via a coupling circuit at both ends) extends from the operator control station OCS to the multiple DUT's within the burn-in station BIS. The bidirectional data highway 78 connects, for each DUT device to be interrogated, two opposite digital INCOM interface devices 80. One associated with the CONI card and the "central" PC computer is configured in the expanded master mode, as earlier stated by reference to FIG. 14, and the other i.e. the local digital Interface device 80, within the BIS station is configured in the stand alone slave mode (80 and 82 in FIG. 4) if the DUT is a stand alone slave, or in the expanded mode slave (80 and 84 in FIG. 4) if the DUT is involving a local microcomputer. Referring to FIGS. 15 to 24A and 24B, consideration will be now given to the essential features of the INCOM 80 considered alone, or in conjunction with the associated coupling network 90.

Referring to FIG. 15, the circuit of INCOM device 80 is shown as an integrated circuit housed in a 28 pin dual in line package. Typically the device consists in a five micron silicon gate CMOS gate array. The signal and pin assignment is shown in FIG. 15. A pin may have one function in the stand alone configuration and another function in an expanded mode (master or slave) configuration. The following is a description of the terminology assigned to each of the pins:

TX—the transmit output of the device 80. Transmits a 33 bit message through a suitable coupling network to the common data line 78.

RX—the receive input of the device 80. All 33 bit network transmissions enter the device through this pin.

RESTN—the active low power on reset input. Resets the internal registers in the device 80.

$V_{dd}$—the power supply input of +5 volts.

$V_{ss}$—the ground reference.

XTAL1 and XTAL2—the crystal inputs. A 3.6864 mHz ±0.015% crystal oscillator is required.

Baud 0 and Baud 1—the baud rate select inputs.

A0-A8—the least significant address bit pins.

A9/CLK—dual function pin. In all but the test modes this pin is the A9 address input pin. In the test mode this pin is the clock strobe output of the digital demodulator in the device 80.

A10/DEMOD—a dual function pin. In all but the test mode this pin is the A10 address input pin. In the test mode this pin is the demodulated output (DEMOD) of the digital demodulator in the device 80.

A11CD—a dual function pin. In all but the test mode this pin is the A11 address input pin. In the test mode this pin is the receive word detect output (CD) of the digital demodulator in the device 80.

BUSYN/COUT—a dual function output pin. In the expanded slave or expanded master modes this pin is the BUSYN output of the micro interface. In the stand alone slave mode this pin is the switch control output (COUT).

INT/TOUT—a dual function output pin. In the expanded master or expanded slave modes this pin is the interrupt output (INT) of the micro interface. In the stand alone slave mode this pin is a timer control pin (TOUT).

SCK/STAT1—a dual function input pin. In the expanded master and expanded slave modes this pin is the serial clock (SCK) of the micro interface. In the stand alone slave mode it is one of the two status inputs (STAT1).

RW/STAT2 a dual function input pin. In the expanded master or expanded slave mode this pin is the read-write control line of the micro interface (RW). In the stand alone slave it is one of the two status inputs (STAT2).

DATA/TIMR—a dual function pin. In the expanded master or expanded slave modes this pin is the bidirectional data pin (DATA) of the micro interface. In the stand alone slave mode this pin is a timer control line (TIMR).

All input pins of device 80 are pulled up to the +5 five volt supply $V_{dd}$ by internal 10k pull-up resistors. The pins which control the modes of operation of the device 80 are pins 1 and 27, identified as mode 1 and mode 2. The relationship between these pins and the selected mode is as follows:

| MODE 1 | MODE 0 | SELECTED MODE |
|---|---|---|
| 0 | 0 | expanded slave |
| 0 | 1 | stand alone slave |
| 1 | 0 | expanded master |
| 1 | 1 | test |

When only the MODE 1 pin is grounded the MODE 0 pin assumes a logic "1" due to its internal pull up resistor and the digital IC 80 is operated in the stand alone slave mode. Device 80 contains a 12 bit address, a switch control output (COUT) and two status inputs (STAT1) and (STAT2). When addressed, device 80 may be commanded to set, or reset, the switch control pin COUT, reply with status information from its two status pins, or both.

When both MODE 1 and MODE 0 pins are grounded, the device 8 is operated in an expanded slave mode, allowing a 12 bit address and a microcomputer interface. The interface is disabled until the central controller 76 enables it by sending an enable interface command to the addressed digital IC 80. The PC computer and microcomputer communicate by loading a serial shift register in the digital device 80. The PC computer does this by sending a 33 bit message to device 80. This causes the microcomputer interface to interrupt microcomputer 84, allowing it to read the shift register. Microcomputer 84 communicates with the PC computer by loading the same shift register and commanding device 80 to transmit it onto the network.

When only mode 0 pin is grounded, MODE 1 pin assumes a logic "1" due to its internal pull up resistor. Device 80 is operated in the expanded master mode (FIGS. 4 and 14). In this mode device 80 operates exactly like in the expanded slave mode, except that the micro interface is always enabled. Any network transmissions that digital device 80 receives produce interrupts to the attached microcomputer 84, enabling it to read the serial shift register of device 80. Also the microcomputer may place data in the shift register and force device 80 to transmit onto the network at any time.

Digital IC 80 is adapted to transmit messages to, and receive messages from, different types of communication network lines, such as the dedicated twisted pair 78, or over fiber optic cables. The digital IC 80 may be pin configured to receive and transmit data at a baud rate of 300 bits per second. Thus, for power line applications the binary bits may consist of a carrier of 115.2 kHz modulated by on-off keying at a 300 band bit rate.

In FIG. 17 the digital IC 80 is illustrated with a line which is a common data line consisting of a dedicated twisted pair 78. Under these conditions the baud 0 pin of the device 80 is grounded, whereas the baud 1 pin assumes a logic value of "1" due to its internal pull up resistor. When device 80 is pin configured as shown in FIG. 17, it is arranged to transmit and receive modulated carrier messages at a 1200 baud rate. The 1200 baud bit rate is possible due to the less noisy environment on the twisted pair 78. In the configuration of FIG. 17 a coupling network 90 is used to couple the device 80 to the twisted pair 78.

For high speed data communication digital IC 80 is also pin configurable to transmit and receive unmodulated data at the relatively high bit rate of 38.4K baud. When so configured the device 80 is particularly suitable for operation in a communications system which employs fiber optic cables 94 (FIG. 18). More particularly, when device 80 is to function with fiber optic cables as at 94, the baud 1 terminal is grounded and the baud 0 terminal assumes a logic value of "1" due to its internal pull up resistor, as shown in FIG. 18. In the fiber optic cable system of FIG. 18, the coupling network 90 is not employed. Instead, the receive pin RX of the device 80 is directly connected to the output of a fiber optic receiver 96 and the transmit pin TX is connected to a fiber optic transmitter 98. A digital IC 80 in the central controller 76 is also interconnected with the fiber optic cables 94 by a suitable transmitter receiver pair 100. The fiber optic receiver 96 and transmitter 98 may comprise any suitable arrangement in which the RX terminal is connected to a suitable photodetector and amplifier arrangement and the TX terminal is connected to a suitable modulated light source, such as a photodiode. For example, the Hewlett Packard HFBR-1501/2502 transmitter receiver pair may be employed to connect the digital IC 80 to the fiber optic cables 94. Such a transmitter-receiver pair operates at TTL compatible logic levels which are satisfactory for direct application to the RX and TX terminals of the device 80.

Figure 19:
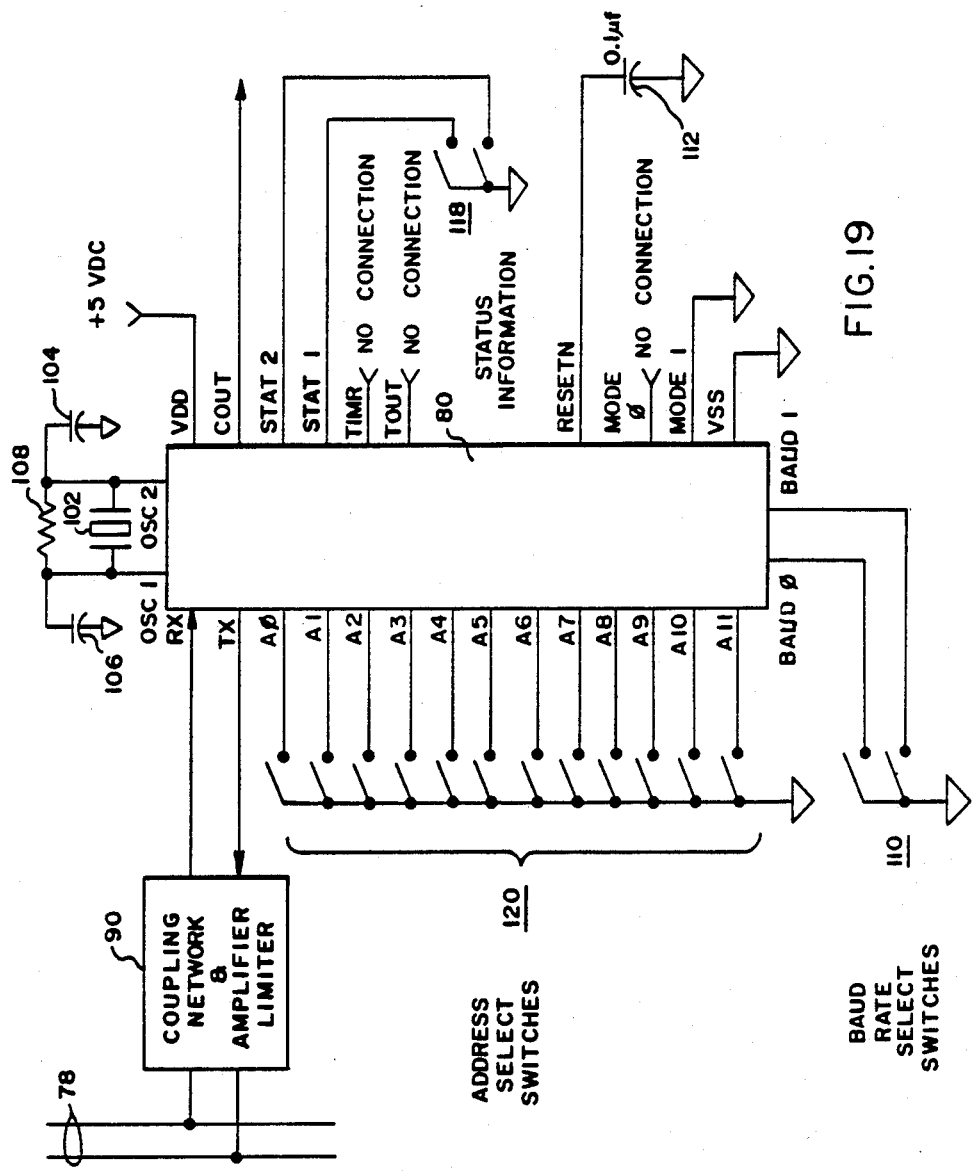
FIG. 19 shows the digital IC of FIG. 15 associated with its coupling network.

In FIG. 19, a typical configuration is shown for device 80 when operated in the stand alone slave mode. Plus 5 volts DC is applied to the $V_{dd}$ terminal and the $V_{ss}$ terminal is grounded. A crystal 102 operating at 3.6864 ±0.015% mHz is connected to the OSC1 and OSC2 pins of the device 80. Each side of the crystal is connected to ground through a capacitor 104 and 106 and a resistor 108 is connected across the crystal 102. Preferably, capacitors 104, 106 have a value of 33 picofarads and resistor 108 has a value of 10 megohms. The baud rate at which the device 80 is to operate can be selected by means of the baud rate switches 110. When these switches are open, device 80 is operating at a baud rate of 300 baud suitable for power line network communication. The MODE 1 terminal is grounded and the MODE 0 terminal is not connected so that device 80 operates in a stand alone slave mode. A 0.1 microfarad capacitor 112 is connected to the RESETN pin of device 80. When power is applied to the $V_{dd}$ terminal of device 80, the capacitor 112 cannot charge immediately and hence provides a reset signal of "0" which is employed to reset various logic circuits in the digital IC 80. Also, a power on reset signal forces the COUT output of the device 80 to a logic "1". As a result, the DUT device is, for instance, SET. Two status information switches are provided for the two lines STAT1 and STAT2, even though only a single device is to be controlled over the COUT control line. Accordingly, one status line can be connected to the COUT line to confirm that the COUT signal was actually developed, and the other status line can be connected to auxiliary contacts confirming that the SET instruction has actually been executed.

A series of twelve address switches 120 may be selectively connected to the address pins A0–A11 so as to provide a digital input signal to an address comparison circuit within digital IC 80. Any address pin which is ungrounded by the switches 120 assumes a logic "1" value inside device 80 through the use of internal pull up resistors on each address pin. In this connection it will be understood that device 80, and the external components associated with it (including coupling network 90) may all be assembled on a small PC board, or card, which can be associated directly with the controlled DUT device.

Figure 20:
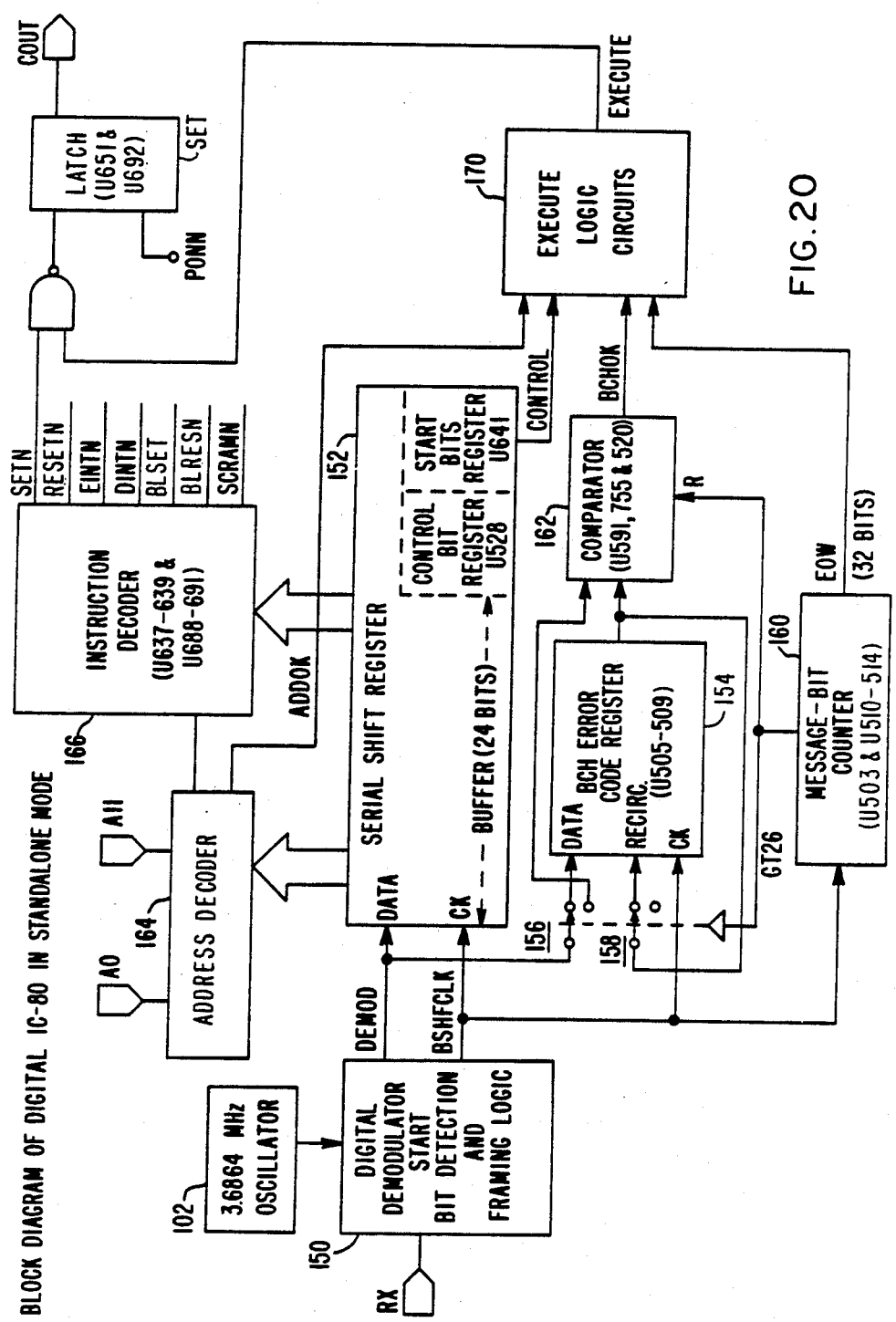
FIG. 20 is a block diagram of the digital IC of FIG. 15 operating in a stand alone slave mode under a command message received for the DUT interrogated in the context of FIGS. 6 and 7.

In FIG. 20, the main components of digital IC 80 are shown in block diagram form when device 80 is operated in the stand alone slave mode and is arranged to receive a message transmitted over the network 78 which includes a SET instruction. The incoming message, amplified and limited in the coupling network 90, is applied to the RX terminal (pin 6) of digital IC 80. The incoming message is a 33 bit message signal having the format described heretofore in connection with FIG. 5A. This incoming message is demodulated in a digital demodulator 150 which also includes the start bit detection and framing logic necessary to establish the bit intervals of the incoming asynchronous message transmitted to device 80 over network 78.

The output of demodulator 150 is supplied to a serial shift register indicated generally at 152. The serial shift register 152 comprises a series of 26 serially connected stages. The first 24 stages are identified as a buffer and store bits B3–B26 (FIG. 5A) of the received message. The next stage is the control bit register U528 which stores the control bit B2 (FIG. 5A) of the received message. The final stage is a start bits register U641 which stores bits B0 and B1 (FIG. 5A) of the received message. It will be recalled that the two start bits B0 and B1 of each message have both a logic value of "1" and hence constitute a carrier signal extending over two bit intervals, so that both bits may be registered in the single register U641. The serial shift register 152 is loaded from the left by the demodulated output applied to the data input of register 152. This data is clocked into register 150 by means of buffer shift clock pulses (BSHFCLK) developed by the demodulator 150 at the end of each bit interval. Accordingly, the incoming message is shifted through the register 152 until the start bits register U641 is set by the two start bits B0 and B1 to a logic "1" value. The bits of the incoming message are stored in the buffer portion of the register 152 in the manner shown in FIG. 5A, with the least significant bit B3 stored in the register next to the control bit register U528.

While the demodulated data bits are being loaded into serial shift register 152, they are also supplied to a BCH error code computer 154. The DEMOD output of the demodulator 150 is supplied through a switch 156 to the input of the BCH error code computer 154 and the output thereof is connected to a recirculating input through a switch 158. The BCH error code computer 154 comprises a series of 5 serially connected shift register stages. When switches 156 and 158 are in the position shown in FIG. 20, a 5 bit error code based on the first 27 message bits which it receives from the demodulator 150 is computed as these bits are being stored in serial shift register 152.

Clock pulses on the BSHFCLK line are used to advance the serial shift register 152. They are also supplied to a message bit counter 160. Counter 160 is a six-stage counter developing an output on its end-of-word (EOW) output line when it counts up to 32. By using two logic "1" start bits which are counted as one, the total message length may be counted by digital logic while providing increased noise immunity due to the longer start bit interval.

Message bit counter 160 also sets a latch at the end of the 26th message bit and develops an enabling signal on its GT26 (greater than 26) output line The GT26 signal controls switches 168 and 158 so that after the 26 th message bit the DEMOD output of the demodulator 150 is supplied to a BCH comparator 162 to which the output of the BCH error code computer 154 is also supplied. At the same time, switch 158 is opened by GT 26 signal, so that the BCH error code computed in computer 154 remains fixed at a value corresponding to the first 26 bits of the received message. Since demodulator 150 continues to supply BSHFCLK pulses to computer 154, the BCH error code developed in the computer 154 is then shifted out and compared bit by bit with the next 5 bits of the received message i.e. B27-B31 (FIG. 5A). The latter constitute the BCH error code portion of the incoming received message and are supplied to the other input of the BCH comparator 162. If all five bits of the BCH error code computed in computer 154 correspond with the five bits of the BCH error code contained in bits B27-B31 of the received message, comparator 162 develops an output on its BCHOK output line.

Digital IC 80 also includes an address decoder indicated generally at 164 which comprises a series of 12 exclusive OR gates and associated logic. As seen from FIG. 5A, bits B11-B22 of a received message contain an address corresponding to the particular stand alone slave DUT with which the operator wishes to communicate. Also, it is recalled. The address select switches 120 are connected to the address pins A0-A11 of digital IC 80 in accordance with the address assigned to each particular stand alone slave DUT. The address decoder 164 compares the setting of the address select switches 120 with the address stored in bits B11-B22 of the buffer portion of the serial shift register 152. If the two addresses coincide, decoder 164 develops an output on its address OK (ADDOK) output line.

Digital IC 80 also includes an instruction decoder 166 which decodes the outputs of the buffer stages corresponding to bits B3-B6 (FIG. 5A) containing the instruction which the addressed stand alone slave is to execute. Assuming that bits B3-B5 all have a logic value of "0", a set instruction is decoded, as shown in FIG. 5B, and the instruction decoder 166 produces an output on its set line (SETN).

The control bit B2 of a message intended for a stand alone slave has always a logic value of "1" indicating that bits B3-B26 include address bits and instruction bits to be compared and decoded in decoders 164, 166 of digital IC 80. When the control bit register U528 of the serial shift register 152 is set, an enabling signal is supplied over the CONTROL output line of register U528 to the execute logic circuits 170. The BCHOK output line of comparator 162, the EOW output line of the message bit counter 160 and the ADDOK output line of the address decoder 164, are also supplied to execute logic circuits 170. Accordingly, when the message bit counter 160 signifies that the end of the message has been reached, comparator 162 indicates that all bits of the received BCH error code agree with the error code computed by the computer 154. The address decoder 164 indicates that the message is intended for this particular stand alone slave, and the control bit register U528 is set. The logic circuits 170 develop an output signal on the EXECUTE line which is ANDED with the SETN output of the instruction decoder in the NAND gate U649, the output of which is employed to RESET latches U651 and U692 so that the COUT output pin of the digital IC 80 goes to a logic value of "0" and power is removed from the controlled device 82. The stand alone slave thus executes the instruction contained in the received message to set DUT device 82.

When the message bit B6 (FIG. 5B) has a logic value of "1", the stand alone slave not only executes a SET instruction in the manner described in connection with FIG. 20, but also is arranged to transmit a reply message back to the operator control station, as shown in FIG. 6. In the reply, message bits B25 and B26 contain the two status inputs STAT1 and STAT2 which appear on pins 26 and 25, respectively, of digital IC 80. This reply message is developed by shifting out the data which has been stored in the serial shift register 152 and using this data onto On-Off key a 115.2 kHz carrier which is, then, supplied to the TX output pin of the device 80. The status signals appearing on the STAT 1 and STAT 2 input pins of device 80, represent the condition of the controlled relay. They are not employed to set the status bits B25 and B26 of the reply message until after 15 bits have been read out of serial shift register 152.

Figure 21A:
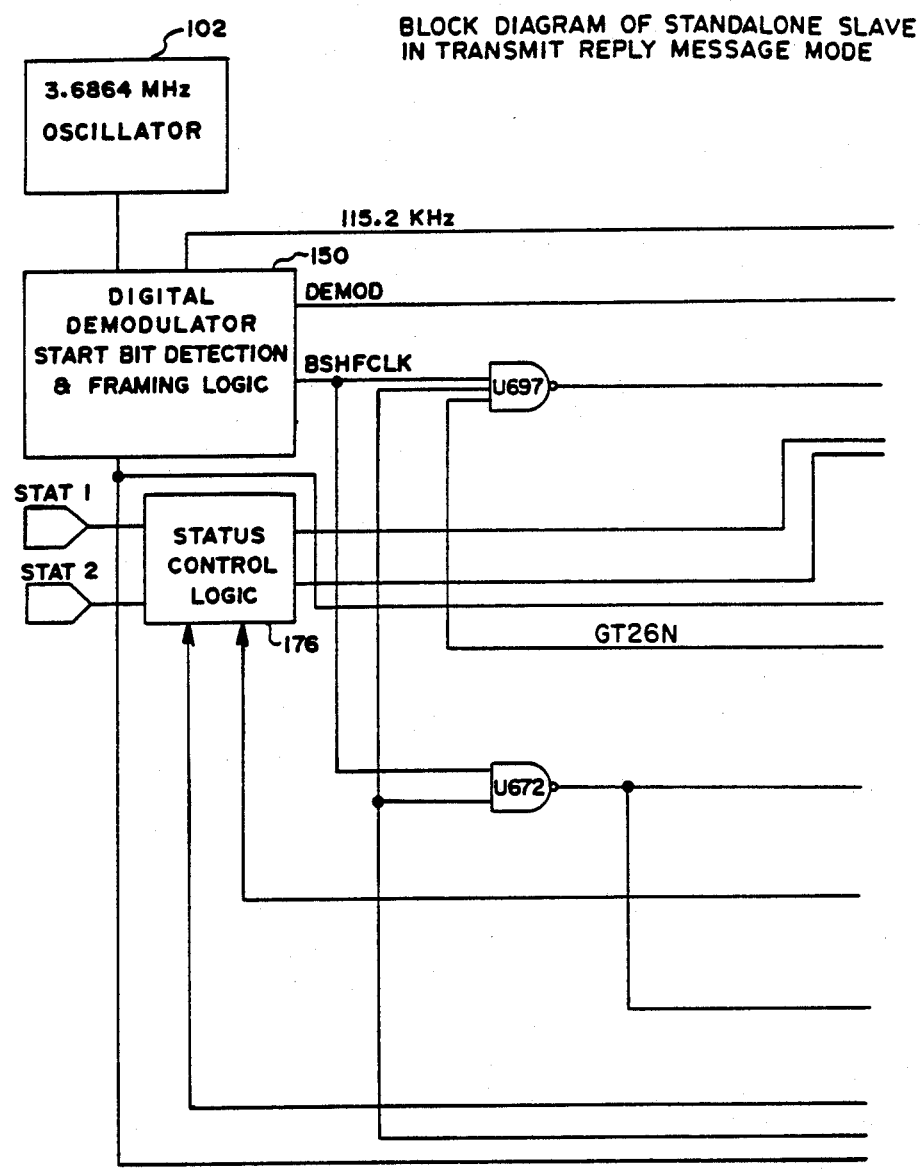
FIGS. 21A to 21C show a block diagram, like the one in FIG. 20, as used for a reply message.
Figure 21B:
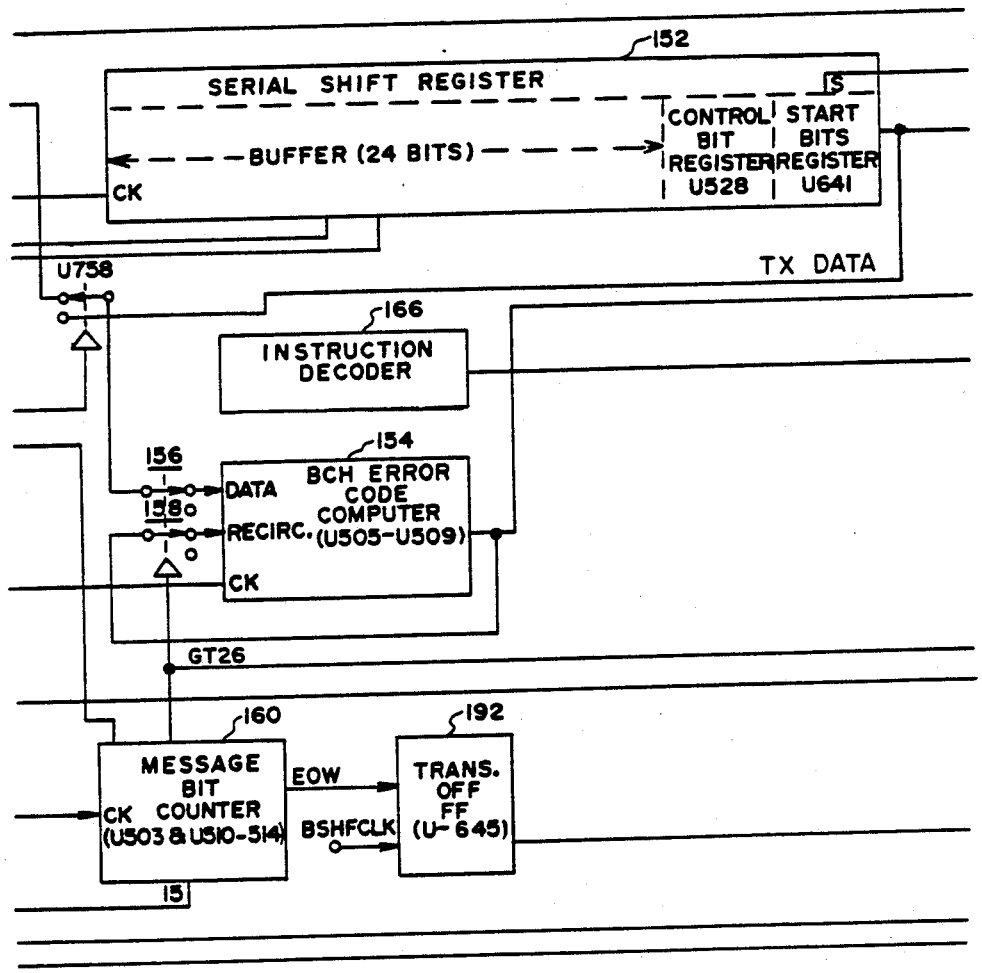
Figure 21C:
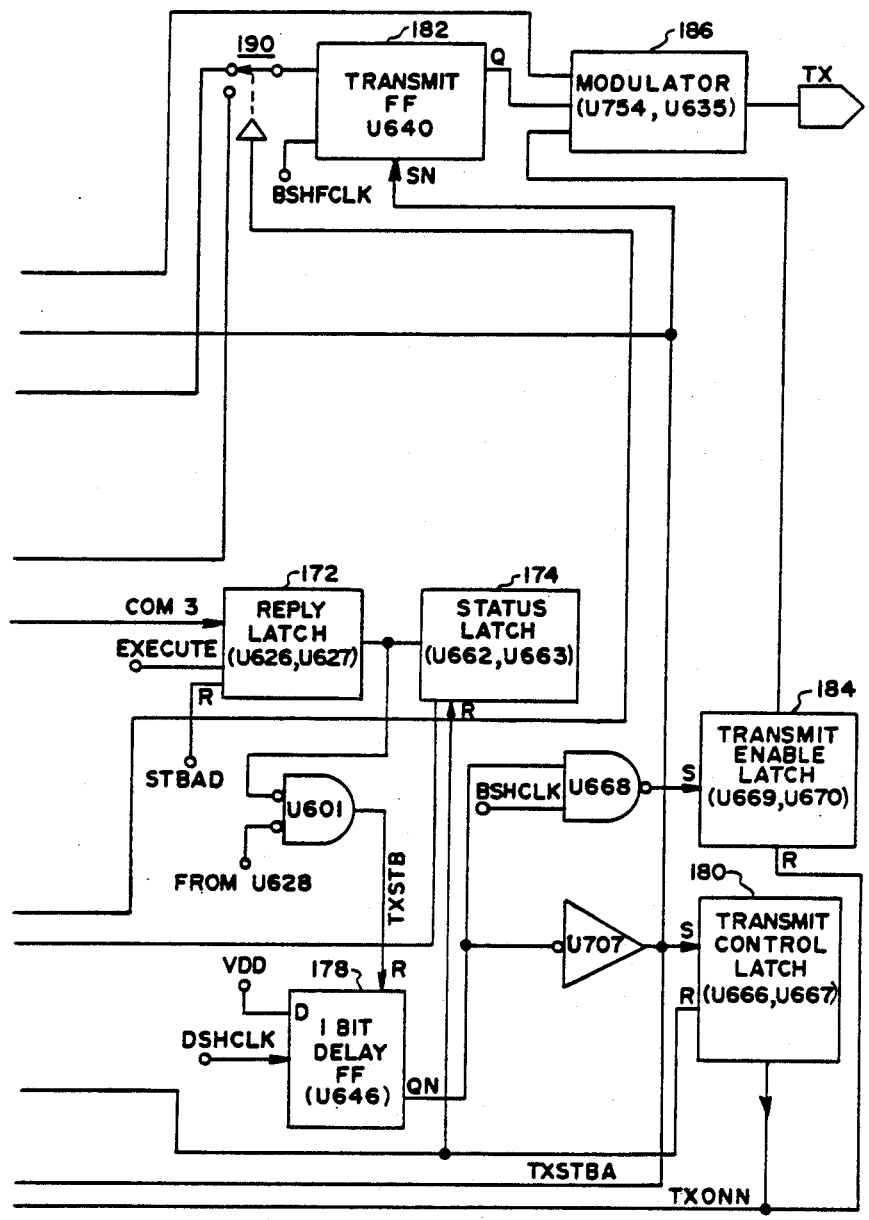

In FIGS. 21A-21C the operation of the stand alone slave in formatting and transmitting such a reply message back to the central controller is shown in block diagram form. It is assumed that a message has been received from the operator control station OCS and has been stored in serial shift register 152 as in FIG. 20. The control bit B2 of the received message has a logic value of "1" and the message bit B6 stored in the buffer portion of the register 152 has a logic value "1" which instructs the stand alone slave to transmit a reply message back to the central controller. When B6 bit has a "1" value the instruction decoder 166 produces an output signal on its COM 3 output line. Also, at the end of the received message the execute logic circuits 170 (see FIG. 20) produce an EXECUTE signal when the conditions described in detail heretofore in connection with FIG. 20 occur. When an EXECUTE signal is produced, a reply latch 172 provides an output which is employed to set a status latch 174. The status latch 174 provides a control signal to the status control logic 176. However, the condition of the status pins STAT 1 and STAT 2 is not employed to set corresponding stages of the buffer portion of the serial shift register 152 until after 15 bits have been shifted out of the register 152. At that time, the message bit counter 160 provides an output on its "15" output line which is employed in the status control logic 176 to set the corresponding states of the buffer portion of register 152. These stages correspond to the location of bits B25 and B26 in the reply message after 15 bits have been shifted out of the register 152.

It is recalled that a message which is transmitted over line 78 requires two start bits having a logic value of "1". However, when the message received and initially detected by detecting the presence of carrier on line 78 for a duration of 2 bits, the two start bits of the received message are stored as a single bit in the start bits register U641. When a reply message is to be transmitted over line 78, it is necessary to provide a modulated carrier of two bits duration in response to the single start bit stored in the register U641. To accomplish this, a transmit strobe signal (TXSTB) is derived from the reply latch 172 and is coupled through the NOR gate U601 to reset a one bit delay flip-flop 178 which has its D input connected to the five volt supply $V_{dd}$. As a result the ON output of flip-flop 178 is inverted to provide a transmit strobe A (TXSTBA) signal which sets a transmit control latch 180. When the latch 180 is set, it provides a transmit ON (TXONN) signal which is employed to release the framing counters in the demodulator 150, so that they begin to provide BSHFCLK pulses at one bit intervals.

For the first 26 bits of the reply message, the output of the start bits register U641 is connected through a switch 190 to a transmit flip-flop 182 which is also set by the TXSTBA signal and is held in a set condition, so that it does not respond to the first BSHFCLK pulse applied to its clock input. At the same time, the ON output of the one bit delay flip-flop 178 is combined with the first BSHFCLK pulse in the NAND gate U668 so as to provide a signal which sets a transmit enable latch 184. When the transmit enable latch 184 is set it provides an enabling signal to modulator 186, to which is also supplied a carrier signal having a frequency of 115.2 kHz from the digital demodulator 150. When the transmit flip-flop 182 is initially set by the TXSTBA line going low, it provides a 1 on its Q output to the modulator 186. Accordingly, when the transmit enable latch 184 provides an enabling signal to modulator 186, a carrier output is supplied to the TX output pin of the device 80 and is supplied to the network 78. During this initial transmission of carrier during the first start bit interval, the data in the serial shift register 152 is not shifted out because BSHFCLK pulses to the clock input of the register 152 are blocked by the NAND gate U697. The NAND gate U697 has as its second input a signal.from the GT26N output line of the message bit counter 160 which is high until 26 bits have been shifted out of the register 152. However, a third input to the NAND gate U697 is the TXSTBA line which went low when the 1 bit delay flip-flop 178 was reset. Accordingly, the first BSHFCLK pulse is not applied to the clock input of the register 152, although this pulse does set the transmit ENABLE latch 184 and enable carrier output to be supplied to the TX output pin for the first bit interval. However, a short interval after the first BSHFCLK pulse, a delayed shift clock pulse (DSHFHCLK), which is also developed in the framing logic of the demodulator 150, is supplied to the clock input of the 1 bit delay flip-flop 178, so that the TXSTBA line goes high shortly after the first BSHFCLK pulse occurs. When the TXSTBA line goes high, the BSHFCLK pulses pass through the NAND gate U697 is shifted out of the register 152 and the serially connected transmit flip-flop 182 to the modulator 186, so that the single start bit stored in the register U641 and the remaining bits B2-B26 of the received message control the modulation of the carrier supplied to the TX output pin. The BSHFCLK pulses are also supplied to the clock input of the transmit flip-flop 182 so as to permit the serial shift of data to the TX output pin. However, when the TXSTBA line is low it holds the flip-flop 182 set so that it does not respond to the first BSHFCLK pulse.

Considering now the manner in which the STAT 1 and STAT 2 status signals from the controlled device are added to the reply message, it will be recalled that the buffer stages are not set in accordance with the signals on the STAT 1 and STAT 2 pins until 15 bits have been shifted out of the register 152 in order to allow time for the relay contacts of the controlled device to assume a final position. Also, the B25 and B26 bits of the received message are reserved for status bits to be added in a reply message so that the last active bit in the received message is B24. When the B24 bit has been shifted 15 times it appears in the B9 stage of the buffer portion of the serial shift register 152. Accordingly, the conditions of the status pins STAT 1 and STAT 2 can be set into the B10 and B11 stages of the buffer after the 15th shift of data in the register 152. To this end, the message bit counter 160 develops a signal on the "15" output line which is sent to the status control logic 176. This logic was enabled when the status latch 174 was set in response to a COM 3 signal indicating that the reply was requested. Accordingly, the status control logic now responds to the "15" signal by setting the B10 and b11 stages in accordance with the potentials on the STAT 1 and STAT 2 pins. In this connection it will be understood that the B10 and B11 stages of the buffer initially contained part of the address in the received message. However, after the received message has been shifted 15 bits during transmission of the reply message the stages B10 and B11 are free to be set in accordance with the status pins STAT 1 and STAT 2 and this status will be transmitted out as a part of the reply message in the B25 and B26 bit positions.

In order to compute a new BCH error code for the reply message transmitted back to the central controller (due to the fact that the status bits B25 and B26 may now contain status information where they were not used in the received message). As soon as the transmit control latch 180 is set the TXONN signal controls a switch U758 so that the DEMOD output of the demodulator 50 is removed from the data input of the BCH error code computer 154 and the output of the serial shift register 152 is connected to this input through the switch 156. However, during the initial 1 bit delay of the flip flop 178 BSHFCLK pulses are blocked from the clock input of the comparator 154 by the NAND gate U672 the other input of which is the TXSTBA line which is low for the first start bit. After the first BSHFCLK pulse the TXSTBA line goes high and succeeding BSHFCLK pulses are supplied to the computer 154. The two start bits of the transmitted message are thus treated as one bit by the computer 154 in the same manner as the two start bittivs of a received message are decoded as one bit for the register U641.

As the data stored in the register 152 is shifted out to the transmit flip-flop 182, this data is also supplied to the data input of the BCH error code computer 154 through the switch 156. Also, the recirculating input of the computer 154 is connected through the switch 158, as described heretofore in connection with FIG. 20. Accordingly, as the 26 bits stored in the register 152 are shifted out of this register, the computer 154 is computing a new BCH error code which will take into account the status information in bits B25 and B26 thereof. After the 26th bit has been shifted out of the register 152 a new five bit error code is then present in the computer 154.

When the message bit counter 160 produces an output on the GT26 line the switches 156 and 158 are opened while at the same time the output of the computer 154 is connected through the switch 190 to the input of the transmit flip-flop 182 in place of the output from the serial shift register 152. Since BSHCLK pulses are still applied to both the BCH error code computer 154 and the transmit flip-flop 182 the five bit error code developed in the computer 154 is successively clocked through the transmit flip-flop 182 to the modulator 186 so as to constitute the BCH error code portion of the transmitted reply message.

When the switch 156 is opened after the 26th bit, a zero is applied to the data input of the BCH error code computer 154 so that as the five bit error code is shifted out of the BCH error code computer 154 the shift register stages are back filled with zeroes. After the five error code bits have been shifted out, the next BSHFCK pulse clocks a zero out of the computer 154 and through the transmit flip-flop 182 to the modulator 186 to constitute the B32 stop bit which has a logic value of "0". This completes transmission of the 33 bit message onto the network 78.

When the message counter 160 has counted to 32 bits its EOW line is supplied to a transmit off flip-flop 192 so that a transmit off signal (TXOFFN) is developed by the flip-flop 192. The TXOFFN signal is employed to reset the status latch 174 and the transmit control latch 180. When the transmit control latch 180 is reset its TXONN output line resets the transmit ENABLE latch 184. The reply latch 172 is reset by timing pulses STBAD developed in the framing logic of the demodulator 150.

Figure 22A:
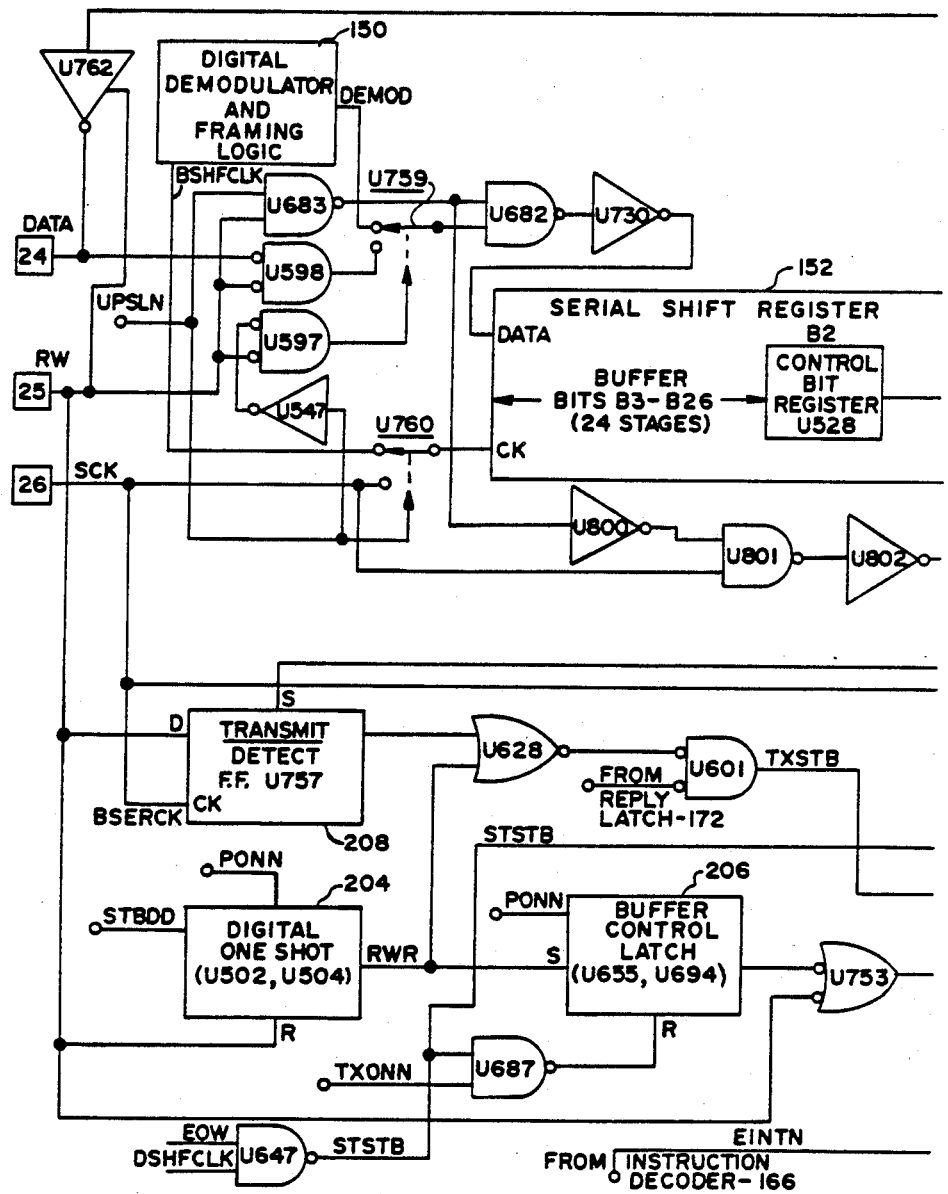
FIGS. 22A and 22B show a block diagram of the digital IC of FIG. 14 operating in the expanded mode, while responding to an enable interface instruction.
Figure 22B:
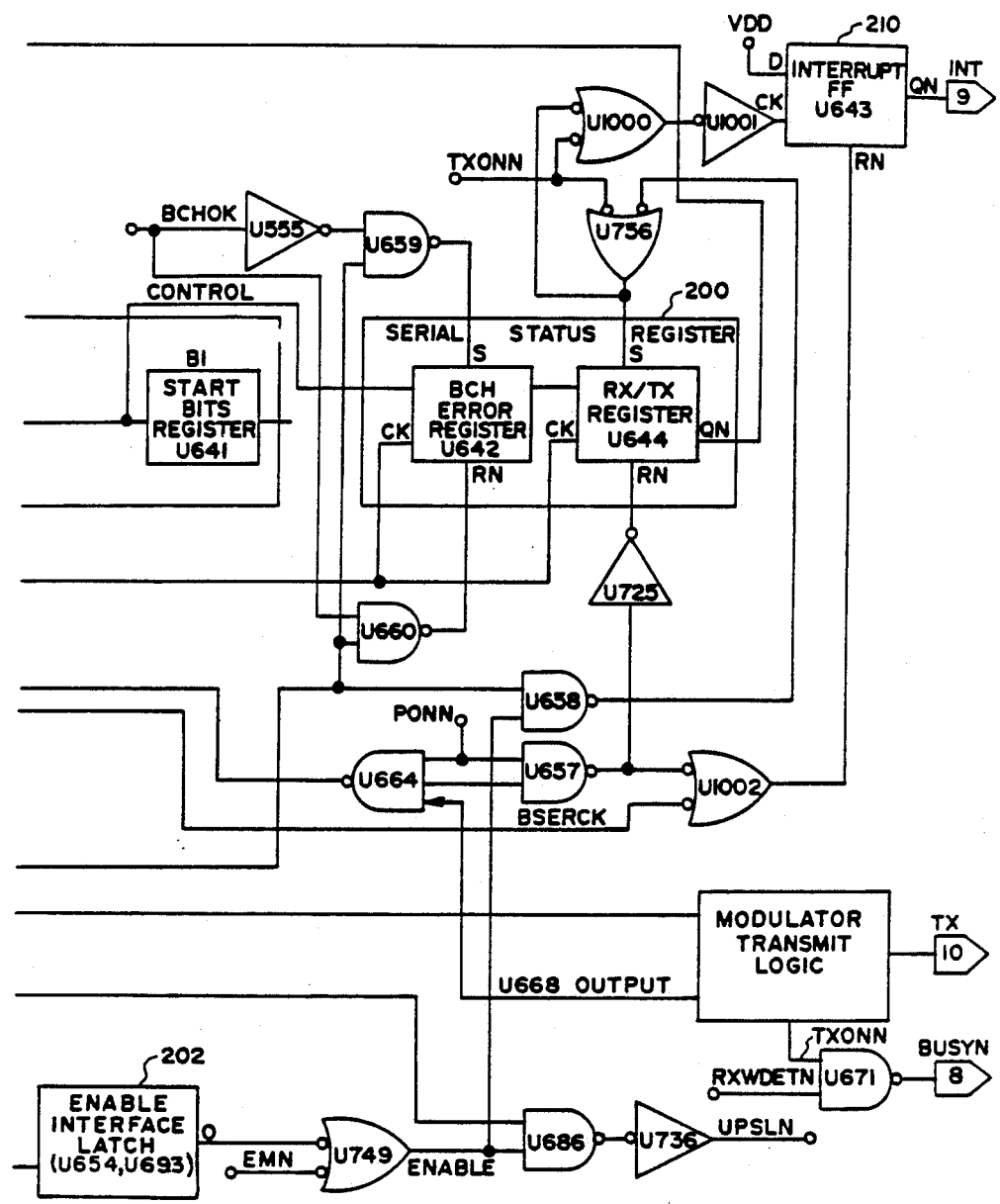

In FIGS. 22A, 22B, there is shown a block diagram, the operation of the device 80 in an expanded slave mode in response to an enable interface instruction. Pin 24 (DATA) of the digital IC is used as a bi-directional serial data line by means of which data stored in the serial shift register 152 may be read out by the associated microcomputer 84, or data from microcomputer 84 can be loaded into register 152. Pin 26 of the device 80 acts as a serial clock (SCK) input by means of which serial clock pulses supplied from microcomputer 84 may be connected to the clock input of register 152 to control the shift of data from this register onto the data output pin 24, of the clocking of data placed on the DATA pin into register 152. Pin 25 for function (RW), is connected as a read-write control line which may be controlled by microcomputer 84 to control either the reading of data from the register 152 or the writing of data into this register from microcomputer 84. The RW line is also used by microcomputer 84 to force the digital IC 80 to transmit the data present in its register 152 onto the network 78 in the 33 bit message format of this network. Pin 9 of the device functions as an interrupt line (INT) to the microcomputer 84 in the expanded mode and supplies an interrupt signal in response to an enable interface instruction which informs the micro 84 that a message intended for it has been stored in the register 152. An interrupt signal is also produced on the INT line after the device 80 has transmitted data loaded into the register 152 onto the network. Pin 8 of the device 80 supplies a busy signal (BUSYN) to the associated micro 84 whenever a message is being received by the device 80 or a message is being transmitted by this device onto the network 78.

In FIGS. 22A, 22B, it is assumed that a message has been received from the PC computer which contains an instruction to establish an interface with microcomputer 84 in bits B3–B5 of the message and that the instruction decoder 166 has decoded this instruction by producing an output on its enable interface output line (EINTN). Also, when device 80 is operating in an expanded slave mode, pins 1 and 27 are grounded and the expanded mode line EMN is high.

In the expanded mode of operation of digital device 80, a serial status register 200 is employed which includes a BCH error register U642 and an RX/TX register U644. The BCH error register U642 is serially connected to the output of the control bit register U528 in the serial shift register 152 over the CONTROL line. The RX/TX register U644 is serially connected to the output of the BCH error register U642 and the output of the register 644 is supplied through an inverting tri-state output circuit U762 to the bi-directional serial DATA pin 24.

When the digital device 80 receives a message from the PC computer including an instruction, it will not execute that instruction unless the BCH comparator 162 provides a BCHOK output which indicates that each bit of the BCH error code in the received message compares equally with the BCH error code computed in the device 80. The BCH error register U642 is set or reset in accordance with the BCHOK output from the BCH comparator 162. The BCH error register V642 is reset when the initial message is received requesting that the interface be established because this instruction would not have been executed if it was not error-free. However, once this interface has been set up the PC computer may send additional messages to microcomputer 84. During receipt of each of these additional messages the BCH comparator 162 compares the BCH error code contained in the received message with the BCH error code computed by the computer 154 and will indicate an error by holding the BCHOK line low if all bits of the two codes are not the same. If the BCHOK line is low the BCH error register U642 is set. However, since the interface has already been set up, this second message stored in the register 152, which contains an error, may be read out by the microcomputer 84 by successively clocking the SCK line and reading the DATA line. The presence of a logic "1" in the BCH error register position (second bit) of the data read out by the microcomputer 84 indicates to the microcomputer 84 that an error in transmission has occurred and that the microcomputer may wish to ask the PC computer to repeat the message.

The RX/TX register U644 is employed to indicate to the microcomputer 84 whether or not the serial shift register 152 is loaded or empty when it receives an interrupt signal on the INT line. If the register 152 has been loaded with a received message from the central controller the RX/TX register U644 is set. When the micro reads out the data stored in the register 152, the serial shift register 152 and the serial status register 200 are back filled with zeroes so that when the readout is completely a zero will be stored in the RX/TX register U644. When data is loaded into the register 152 and transmitted out to the network, this zero remains stored in the RX/TX register since it is not used during transmission. Accordingly, when an interrupt is produced on the INT line after the message is transmitted, the RX/TX register U644 remains at zero so as to indicate to the microcomputer that the message has been sent and the register 152 is empty.

When the digital IC 80 is arranged to receive a message from line 78, the switches U759 and U760 have the position shown so that the output of the demodulator 150 is supplied to the data input of the serial shift register 152 and by means of the BSHFCLK pulses applied to the clock input of the register 152.

While the interface is established to microcomputer 84 no more network transmissions will be demodulated and placed in the serial shift register 152 until microcomputer 84 relinquishes control. However, after control is shifted to microcomputer 84, the digital demodulator 150 continues to demodulate network messages and, when a network message is received, it produces a signal on its RXWDETN output line. This signal is transmitted through the NAND gate U671. The output of the NAND gate U671 is inverted to produce a BUSYN output signal to the associated microcomputer 84. The microcomputer 84 is thus informed that the device 80 has detected activity on line 78. This activity might be that the PC computer is attempting to communicate with the microcomputer through the enabled slave mode digital IC 80. When digital IC 80 is transmitting a message back to the PC computer over line 78, the TXONN signal developed by the transmit control latch 180 also supplies an active low signal to the BUSYN output pin to inform the microcomputer 84 that a message is being transmitted by the digital IC 80 to the PC computer over line 78.

How control of register 152 is shifted from line 78 to microcomputer 84 will appear from the enable interface command being decoded by the instruction decoder 166. An EINTN output is produced which sets an enable interface latch 202. The low output of the latch 202 is combined with the master slave signal EMN, which is high in the expanded slave mode, in the NAND gate U749 so as to provide an active high signal on the ENABLE output of the NAND gate U749 which is one input of the NAND gate U686. Assuming that the other input of the NAND gate U686 is also a 1, the output of U686 goes low which is inverted in the inverter U736 so that the UPSLN line goes high. The UPSLN line is employed to control the switches U759 and U760 and when it is high switches the data input of the register 152 to the bi-directional serial DATA line through inverter U547 and the clock input of the register 152 to the serial clock SCK line. The UPSLN line directly controls switch U760 so that the SCK serial clock line is connected to the clock input of register 152. Also, the UPSLN line, through the inverter U547, is one input of the NOR gate U597, the other input being the RW line which is normally high due to an internal pull up resistor in the digital IC 80. Accordingly, a high on the UPSLN line causes switch U759 to disconnect the demod output of modulator 150 from the data input of the register 152 only when the RW line is low.

When microcomputer 84 wishes to read data stored in the serial shift register 152, it does so by providing serial clock pulses to the SCK line. At the same time, the RW line is high which controls the tri-state output circuit U762 to connect the output of the RX/TX register U644 to the bidirectional DATA line. Accordingly, the DATA pin will contain the state of the RX/TX register U644 which can be read by the microcomputer 84. When the UPSLN line is high and the RW line is also high the output of the NAND gate U683 is low which is inverted by the inverter U800 and applied as one input to the NAND gate U801 the other input of which is the SCK line. The output of NAND gate U801 is inverted by inverter U802 and supplied to the clock inputs of the BCH error register U642 and the RX/TX register U644, so that these registers are also shifted by pulses produced by the micro on the SCK line. Accordingly, when the micro clocks the SCK pin once all of the data in the serial shift register 152 and the serially connected serial status register 200 is shifted to the right so that the state of the BCH error register U642 will be present at the DATA pin. The micro can then read the DATA pin again to obtain the state of this register. This clocking and reading process continues until the micro had read out of the DATA pin all of the data in serial shift register 152 and serial status register 200. In this connection it will be noted that the start bit register U641 is bypassed during the readout operation since its information is used only in transmitting a message to the network.

When an enable interface signal is produced and the UPSLN line is high, the RW line is also high which produces a zero on the output of U683. The fact that both the UPSLN line and the RW line are high forces switch U759 to the DEMOD position. However, since the output of U683 is low the data input to the serial shift register 152 will always be logic zeros. Accordingly, a data is being read out of the register U644 on the DATA pin 24 the register 152 and the serial status register 200 are being back filled with zeros. After the entire contents of these registers has been read out the RX/TX register U644 contains a zero so that a zero appears on the DATA pin thereafter. When the micro receives a second interrupt on the INT line after a message has been transmitted, micro computer 84 reads the DATA pin and verifies that the message has been sent.

The stages of the serial status register 200 are set at the end of either a received message or a transmitted message to provide the above-described information to the micro. At the end of a received message, message bit counter 160 produces an EOW signal which is combined with DSHFCLK pulses from the digital demodulator 150 in the NAND gate U647 (FIG. 22A) to provide a status strobe signal STSTB. The STSTB signal is combined with the BCHOK signal in the NAND gate U660 so that the BCH error register U642 is reset if the received message was error free. The BCHOK signal is inverted in the inverter U555 whose output is also combined with the STSTB signal in the NAND gate U659 so that the BCH error register U642 is set if there was an error in the received message. The STSTB signal is also combined with the ENABLE signal in the NAND gate U658 the output of which is supplied to one input of a NAND gate U756 the other input of which is the TXONN line which is high when the device 80 is not transmitting a message. Accordingly, the RX/TX register U644 is set at the end of a received message.

When device 80 transmits a message to line 78, the TXONN line is low so that at the end of such transmission the STSTB signal does not set the register U644. However, register U644 is back filled with a zero as data is being read out of register 152. Accordingly, the micro can read the DATA pin, to which the output of the register U644 is connected, and determine that a message has been transmitted to line 78 and that register 152 is empty. Register U644 is reset when power is applied to device 80 and when the interface is disabled and the ENABLE signal disappears. Reset is accomplished through the NAND gate U657 and inverter U725 which together act as an AND gate, the inputs of which are the PONN signal and the ENABLE signal.

After the micro has read out the data stored in the serial shift register 152 and the status register 200, it can either switch control back to the network immediately, or it can load data into the serial shift register 152 and command device 80 to transmit the data loaded into the register 152 onto line 78 in a 33 bit message. The micro switches control back to line 78 immediately by pulling the RW line low and then high. However, the low to high transition on the RW line, which is performed by microcomputer 84, occurs asynchronously with respect to the framing logic in the demodulator 150. Accordingly, it is important to make sure that device 80 sees the zero to one transition which the microcomputer 84 places on the RW line. This transition is detected by a digital one shot 204 the two stages of which are clocked by the STBDD timing pulses from the framing logic in the demodulator 150. The stages of the one shot 204 are reset by the RW line so that during the period when the RW line is held low by the microcomputer 84 the output line RWR of the one shot 204 remains high. However, upon the zero to one transition on the RW line the digital one shot 204 is permitted to respond to the STBDD pulses and produces an output pulse on the RWR line of guaranteed minimum pulse width due to the fact that it is derived from the framing logic timing pulses in the demodulator 150. The RWR line thus goes low for a fixed interval of time in response to a zero to one transition on the RW line.

When the RWR line goes low it sets a buffer control latch 206 the output of which is connected to one input of the NAND gate U753. The other input of the NAND gate is the RW line. Accordingly, after the zero to 1 transition on the RW line this line is high so that the output of the NAND gate U753 is no longer a "1" and the UPSLN line goes from high to low. When this occurs the switches U759 and U760 are returned to the positions shown in FIG. 22A, so that buffer control is shifted from the micro back to the network.

Considering now the situation where the micro wishes to load data into serial shift register 152 and command device 80 to transmit the data in the register 152 onto line 78, the micro first pulls the RW line low which enables data to be transmitted from the DATA line through the NOR gate U598, the switch U759, the NAND gate U682 and the inverter U730 to the data input of the register 152. As stated previously, a high on the UPSLN line has also caused the switch U760 to connect the SCK serial clock line to the clock input of the register 152. Data from the micro may now be placed on the DATA pin and clocked into the register 152 by the positive clock edges of the SCK clock pulses. Data entering the register 152 begins with a control bit having a logic value of "0" followed by the least significant bit of the buffer bits B3–B26 and it ends with the most significant bit of the buffer bits. It should be noted that the micro does not load start bits register U641.

After this data has been loaded into register 152, the micro pulls the RW pin high. The low to high transition on the RW line (after SCK pulses have been supplied to the SCK line) is interpreted by the device 80 as meaning that data has been loaded into register 152 and that this data should not be transmitted out to line 78 in the 33 bit message format. To detect this condition a transmit detect flip flop 208 is employed. More particularly, the clock pulses developed on the SCK line by microcomputer 84, identified as BSERCK pulses, are applied to the clock input of the flip-flop 208 and the RW line is connected to its D input. When the RW line is low and a BSERCK pulse is transmitted over the SCK line from the microcomputer 84 the Q output line of the flip-flop 208 goes low. This output is supplied to the NOR gate U628 the other input of which is the RWR line. Accordingly, when the RW line is again pulled high at the end of transmission of data into the register 152 the RWR line goes low so that the output of the NOR gate U628 goes high. This output is supplied as one input to a NOR gate U601 and passes through this gate so as to provide a low on the TXSTB line. A low on the TXSTB line causes the device 80 to transmit the data stored in the serial shift register 152 onto the network in the 33 bit network format like when the device 80 transmitted a reply message back to the central controller. However, since the micro does not load data into the start bits register U641, it is necessary to set this register before a message is transmitted. This is accomplished by the TXSTBA line which goes low at the beginning of a transmitted message and sets the register stage 641. Accordingly, when the TXSTBA line goes high at the end of the 1 bit delay provided by the flip-flop 178, the start bits register U641 is set and its logic "1" can be shifted out to form the second half of the two bit start signal of the transmitted message as described previously.

When the transmit enable latch 184 is set at the start of transmission of this message, the output of the NAND gate U668 is employed to set the transmit detect flip flop 208 through the NAND gate U664 the other inputs of which are the power on signal PONN and the ENABLE signal. When an STSTB signal is produced at the end of this transmitted message in response to the delayed clock pulses DSHFCLK the TXONN line is low so that the output of a NAND gate U687, to which these two signals are inputted, remains high leaving the buffer control latch 206 set. This means that buffer control, which was switched to the network at the beginning of transmission, remains that way.

In order to signal the associated microcomputer 84 that an interface is being set up between the expanded slave mode device 80 and the micro so that two-way data transmission over line 78 is possible, device 80 produces a high on the INT pin 9 as soon as an enable interface instruction is decoded by the decoder 166. More particularly, when the RX/TX register U644 is set at the end of a received message containing the enable interface instruction, as described previously, the output of the NAND gate U756 is supplied as one input to the NAND gate U1000 the other input of which is the TXONN line. Since the TXONN line is high except during transmission a clock pulse is supplied to the interrupt flip-flop 210, also identified as U643. The D line of the flip-flop 210 is connected to the 5 volt supply so that when this flip-flop receives a clock pulse its ON output goes low, which is inverted and supplied to the INT pin 9 of the device 80. This signals the associated microcomputer that an interface has been established between it and the expanded slave device 80, so that the micro may read the data stored in the serial shift register 152 from the DATA pin and load data into this register. As soon as the micro produces the first pulse on the SCK line (either in reading data from register 152 or writing data into the register 152), this SCK pulse resets the interrupt flip flop 210 and removes the interrupt signal from the INT line. More particularly, this SCK pulse is supplied to one input of a NOR gate U1002 the other input of which is the output of a NAND gate U657. The output of the NAND gate U657 is high when the interface is enabled and power is on the device 80 so the first SCK pulse resets the interrupt flip flop 210.

If the micro loads the serial shift register 152 and instructs the expanded slave device 80 to transmit this message back to the network the TXONN line goes low during such transmission. During such transmission the NAND gates U756 and U1000 are blocked so that the RX/TX register U644 is not set a the end of the transmitted message. However, when the TXONN line goes high again after the message has been transmitted the interrupt flip-flop 210 is again clocked so that a signal is produced on the INT pin thus signalling the micro that transmission of a message back to the central controller has been completed. The fact that transmission has been completed can be verified by the micro by reading the DATA pin which is tied to the output of the RX/TX register U644 and would show a "0" stored in this register. In this connection it will be noted that the micro can read the DATA pin any time that the RW line is high to enable the tristate output U762, even though control of the register 152 has been shifted back to the network. Clocking of the interrupt flip-flop 210 is timed to coincide with the trailing edge of the BUSYN signal on pin 9 so that the INT line goes high at the same time that the BUSYN line goes high.

Figure 23:
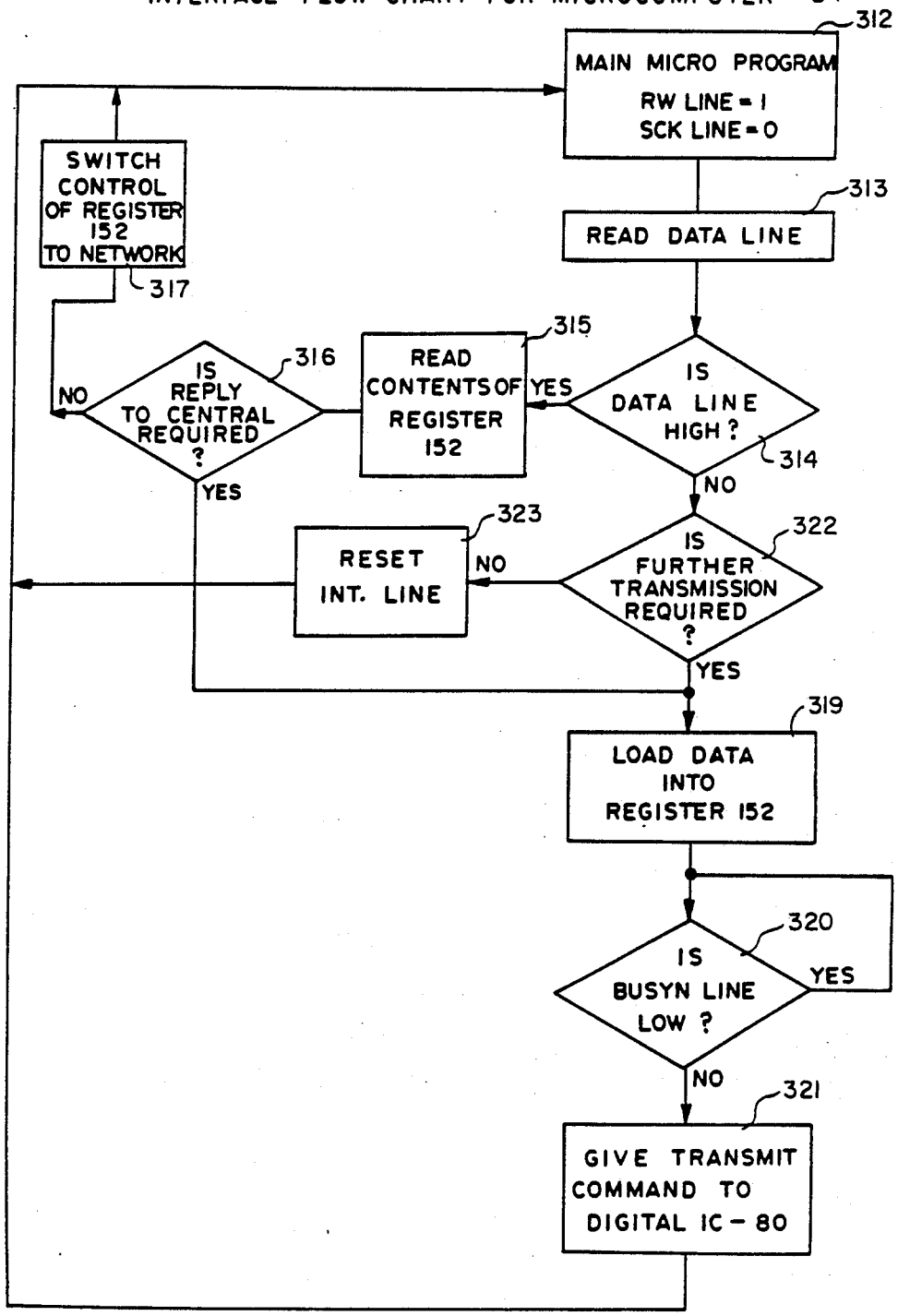
FIG. 23 provides the interface flow chart for the interface microcomputer used.

While the microcomputer 84 may be programmed in any suitable manner to receive data from and transmit data to the expanded mode slave digital IC 80, in FIG. 23 there is shown a general or high level flow chart for microcomputer 84 by means of which it may respond to the interface and establish bidirectional communication with and data transmission to line 78 through the digital IC 80. Referring to this figure, it is assumed that the associated digital IC 80 has received a message which includes an enable interface command but has not yet produced an interrupt on the INT line. Under these conditions the RW line is high and the SCK line is low, as indicated by the main micro program block 312. As soon as an interrupt occurs on the INT line the micro reads the DATA line, as indicated by the block 313 in the flow chart of FIG. 23. As described generally heretofore, the RX/TX register U644 is set at the end of a received message which includes an enable interface command so that the DATA line, under these conditions is high. Accordingly, the output of the decision block 314 is YES and the micro then reads the contents of the register 152 in the digital IC 80, as indicated by the process block 315. The micro performs this read out by clocking the SCK line 27 times and reading the DATA line on the leading edge of each SCK pulse. After the 27th SCK pulse a zero will be stored in the RX/TX register U644, as described in FIGS. 22A, 22B.

After it has read the contents of the register 152 the micro has to decide whether it wishes to reply back to the central controller or whether it wishes to switch control of the register 152 back to the network without a reply, as indicated by the decision block 316 in FIG. 23. Assuming first that the micro wishes to switch control back to line 78 without a reply, as indicated by the process block 317, the micro accomplishes this by holding the SCK line low and pulling the RW line low and then back high. When control is switched back to line 78, the program returns to the main micro program to await the occurrence of another interrupt on the INT line in response to a message from the central controller. As soon as the micro sends one pulse over the SCK line to read out the contents of the register 152, interrupt FF U643 is reset and the INT pin goes low again.

After reading the contents of the register 152, microcomputer 84 may wish to reply to the PC computer by loading data into register 152 and commanding the digital IC 80 to transmit a 33 bit message signal to line 78 including this data. Under such conditions the output of the decision block 316 is YES and the microcomputer 84 can load data into the register 152 as indicated by the process block 319. The micro loads data into register 152 by pulling the RW line low and then serially placing data bits on the DATA line and clocking each bit into the register 152 by the positive clock edges of SCK pulses it places on the SCK line. Data entering the chip begins with the control bit, followed by the least significant bit of the buffer bits and it ends with the most significant bit of the buffer bits. The SCK line is thus clocked 25 times to load the register 152.

After register 152 is loaded, microcomputer 84 reads the BUSYN line to determine whether it is high or low, as indicated by the decision block 320. It will be recalled that the BUSYN line goes low if a message on the network is demodulated by the digital demodulator portion of digital IC 80 even though control of register 152 has been shifted to microcomputer 84. Also, a burst of noise may be interpreted by demodulator 150 as an incoming signal. Under these conditions, microcomputer 84 should not command the IC 80 to transmit a message onto the network. If the BUSYN line is high the micro then gives a transmit command to the digital IC 80, as indicated by the process block 321. This command is performed by pulling the RW line high after it has been held low during the loading of data into the digital IC 80. Control is then returned to the main micro program, as indicated in FIG. 23.

After digital IC 80 has transmitted the data which has been loaded into register 152 onto line 78 it produces an interrupt high on the INT line at the end of the transmitted message. In response to this interrupt the data line is again read by the micro, as indicated by the block 313. However, at the end of a transmitted message the data line is no longer high since the RX/TX register U644 contains a zero at the end of a transmitted message. Accordingly, the output of the decision block 314 is negative and the program proceeds to the decision block 322 to determine whether further transmission is required from microcomputer 84 to the PC computer. If such transmission is required, further data is loaded into the register 152, as indicated by the block 319. On the other hand, if no further transmission is required the INT line is reset as indicated by the process block 322. This is accomplished by holding the RW line high while applying one SCK pulse to the SCK line. This single SCK pulse resets the interrupt flip flop 213 (FIG. 22B) and removes the interrupt signal from the INT line.

It will thus be seen that the present communication system provides an extremely flexible arrangement for bidirectional communication between the PC computer and an interrogated microcomputer 84 through a digital IC 80. After the interface is set up, the micro reads the message transmitted from the central controller to the IC 80 and can either switch control back to the central controller to receive another message or may transmit a message of its own to the central controller. Furthermore, the micro can send a series of messages to the central controller by successively loading data into the register 152 and commanding the digital IC 80 to transmit this data back to the central controller, as indicated by blocks 319, 320 and 321 in FIG. 23. In this connection it will be understood that after the interface is initially set up in the first message transmitted by the PC computer, subsequent messages therefrom to the micro use all 24 buffer bits as data bits and the control bit is a "0". All other devices 80 along line 78, whether in the stand lone slave mode, or the expanded mode, will interpret such a message as not intended for them due to the fact that the control bit is reset, even though the data transmitted may have a pattern corresponding to the address of one of these other devices 80. The transmission of data back and forth between the PC computer and microcomputer 84 continues until the PC computer decides to disable the interface.

The interface may be disabled by a direct disable interface instruction to the device 80 associated with the particular microcomputer, in which case the message transmitted by the PC computer will have a control bit set ("1") and will have address bits corresponding to the address of this device 80. The device 80 will respond to the disable interface instruction by resetting the enable interface latch 202 (FIG. 22B). In the alternative, the PC computer can disable the interface implicitly by simply transmitting a message over line 78 which is addressed to another digital IC 80 in which the control bit is set. The interfaced digital IC 80 will also receive this message but will recognize the occurrence of a control bit of "1" together with an address which is not its own. It will disable the interface in response to such condition. However, in the expanded slave mode such implicit mode of disabling the interface will not be effective if a BCH error is detected in the received message. This is done because the received message might have been intended for the interfaced microcomputer but a noise impulse caused the control bit to be demodulated as a "1" instead of a zero. Under these conditions, the BCHOK line will not go high at the end of the received message and this condition is used to maintain the interface.

Referring now to FIGS. 4 and 14, the digital IC 80 may also be pin configured to operate in an expanded master mode. In the expanded master mode the device 80 is permanently interfaced with the PC computer. This interface is permanently established when the MODE 1 pin of the device 80 is ungrounded, so that the EMN line in FIG. 22B is always low and the ENABLE line is always held high through the NAND gate U749. The expanded master device 80 should have an address which is different from the address of any of the other devices 80 on line 78.

From the above, it appears that the digital IC 80 can function as an addressable microcomputer interface between line 78 and any interrogated local microcomputer of the burn-in chamber BIS. The digital IC's function is to take data from line 78 and pass it on to the local microcomputer upon command from the PC computer in the operator control station OCS0 and to transmit data from the microcomputer to the PC computer. The local digital IC device 80 may also function as an addressable DUT controller, associated with an individual DUT and responding to commands, such as SET and RESET from the PC computer over the common line 78. When so used the digital IC may also be commanded to transmit a reply message back to the PC computer giving information as to the status of the DUT, thus enabling the PC computer to centrally monitor a large number of DUTs. A digital IC is also used functioning as a nonaddressable microcomputer interface between the PC computer and line 78. In such case the digital IC's function is to continuously take data from the PC computer and place it on line 78 in the proper format or to take data from line 78 and pass it back to the PC computer.

FIGS. 24 to 30 are flow charts for the ICM driver module. FIG. 24 is an overall flow chart illustrating how the ICM functions with the timer task interrupt service routine of the IBM PC DOS operating system which generates an interrupt signal every 55 milliseconds. FIG. 25 is a flow chart of the ICM timer tick routine which uses the DOS system timer tick to determine whether all eight bytes of the eight byte output message string have been developed by the application software within a predetermined time interval. This figure also shows how the ICM utilizes the DOS system timer tick to establish a receive timeout interval during which a response to the output message of the master should be received from the INCOM network.

FIG. 26 is a flow chart illustrating how the ICM responds to a CONI card interrupt. If an INCOM message has been received by the CONI card, ICM stores the message, as shown by the GET Rx MESSAGE routine of FIG. 7. It will be noted from FIG. 27 that the ICM releases the CONI card and sets an overflow error if the number of messages from the CONI card is greater than the capacity of the Rx buffer of the ICM, i.e., greater than 32 response messages. The ICM also increments its response messages received counter as each response message is received and when the number of messages received equals the number of responses expected (bits 3 through 7 of 7th byte of the eight byte string) the ICM sets an all response messages received flag (bit 1 of 4th byte of last Rx message) to inform the application software of this event.

Figure 28:
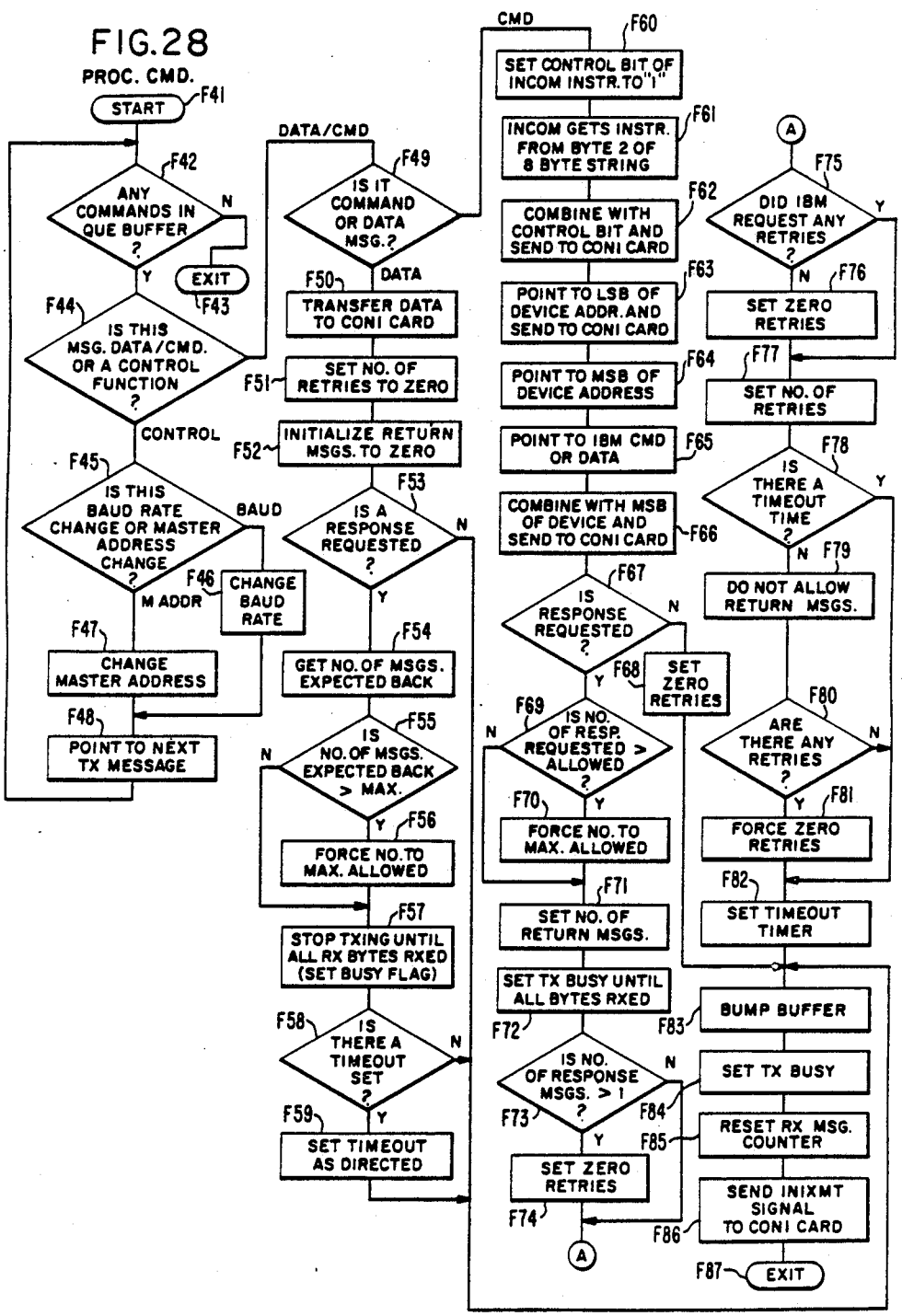

From FIG. 26, it can also be seen that if all messages have been received from the CONI card, no messages are coming in from the CONI card and it is ready to take another message, the process command routine shown in FIG. 28 is utilized. Referring to FIG. 28, it will be seen that the ICM determines whether a command from the application software is stored in its que buffer and whether this command is a control message (baud rate or counter address change) or a command or data message. If it is a data message, the data is sent to the CONI card, the number of retries is set to zero and the number of return messages is initialized to zero. If a response is expected back (bit 0 of 7th byte) the number of responses is determined from bits 3 through 7 of the 7th byte. If the application software attempts to call for more response messages than the ICM is capable of handling, the ICM forces the number of responses to the maximum allowed and then stops transmitting any further output messages until all bytes of the expected response messages have been received.

If the eight byte string is a command message to the INCOM network, the ICM reformats the control bit, INCOM instruction, INCOM address and master command derived from the eight byte string into the format required by the INCOM network and sends the command to the CONI card. The number of responses and number of retries are determined from the eight byte string as sell as the desired setting for the timeout timer and an initiate transmit (INIXMT) is then sent to the CONI card.

FIG. 29 is a flow chart of the operation of the ICM in receiving an eight byte string from the DOS operating system of the IBM and FIG. 30 is a flow chart of the operation of the ICM in inputting data to the DOS operating system upon request.

```
10      ' FILENAME: YYYYYY  ==> DYNAMIC INCOM BURN-IN DIAGNOSTICS
20      '
30      ' THIS PROGRAM PERMITS THE IBM-PC TO BE USED AS A " PRODUCTION TEST
          MASTER & DATA LOGGER" BY EXERCISING AND INTERROGATING SEVERAL (16)
          PRODUCT(S), "YYYYYYY" UNDER VARIOUS TEST CONDITIONS.
40      '
62      '
80      GOSUB 750                 ' SETUP PROGRAM: DEFINE ALL VARIABLES
90      '
100     '    BEGIN MAIN PROGRAM LOOP
160     '
170     ' ****************************************************************
180     ' ****************************************************************
190     '
200     '                 SYSTEM MASTER
210     '
220     '  THE TEST MASTER EXERCISES EACH PRODUCT BY CONDUCTING A VARIETY OF
           TESTS. DATA REPRESENTING THE RESULTS OF EACH TEST AS WELL AS
230     '  ANALOG DATA FOR 4 CHANNELS AT 4 GAIN SELECTIONS ARE PRESENTED. THE DATA
           IS STORED IN AN ARRAY CALLED DAT(X,Y), AND IS IMMEDIATELY DISPLAYED ON
240     '  THE IBM'S CRT. THE DATA IS LOGGED ONTO FLOPPY DISK ONCE AN HOUR.
           IF A CHANGE IS NOTED IN THE STATUS OF THE FLAGS A HARD COPY IS
250     '  RECORDED ON THE PRINTER.
260     '
270     GOSUB 7670                ' DISPLAY SCREEN HEADINGS
280     '
290     INST=3:ADDHI=0:CNTRL=1    ' SETUP MSGOUT$ FIXED FIELDS
300     '
310     '
320     '
330     '
340     '
350     '
360     COMM = 1                  ' RETRIEVE DATA FROM PRODUCT(S)
370     FOR ADDLO = 0 TO 15
390     Y = ADDLO                 ' SET Y (VERTICAL POSITION OF DAT(X,Y)) = TO
                                  ' ADDLO
400     '
410        GOSUB 1850             ' CLEAR INCOM RECEIVE BUFFER (DRIVER SOFTWARE)
420        GOSUB 2120             ' SEND INCOM MESSAGE
430        GOSUB 2220             ' RECEIVE INCOM MESSAGE
440     '
450        GOSUB 1000             ' STORE DATA IN RAM BUFFER (ARRAY > DAT(30,16))
460        GOSUB 2600             ' DISPLAY PAGE 1 DATA.
462        GOSUB 6870             ' DELAY FOR VIEWING SCREEN
464        GOSUB 4760             ' DISPLAY PAGE 2 DATA
470        GOSUB 2010             ' CLEAR RECV(13,3) BUFFER
480     NEXT ADDLO
490     '
500     '
508     '
510     '
538     '
540     GOSUB 1590                ' HAS ONE HOUR ELAPSED ON SYSTEM CLOCK ????
550     GOTO 650
570     '
580     GOSUB 6930                ' LOG DATA >> FLOPPY DISK
590     '
600     RFCDATA = 0               ' RESET RECORD DATA FLAG

10      REM   PROGRAM NAME  " ZZZZZZZ " ==> DYNAMIC INCOM BURN-IN DIAGNOSTICS
20      '     THIS PROGRAM PERMITS THE IBM-PC TO INTERROGATE A FINITE NUMBER OF
30      '     "ZZZZZZZ PRODUCT.
40      '
70      '
80      GOSUB 2300                ' SETUP PROGRAM: DEFINE ALL VARIABLES
90      '
100     ' ****************************************************************
110     ' ****************************************************************
120     '
130     '    BEGIN MAIN PROGRAM LOOP
140     '
150     '                 SYSTEM MASTER
160     '
```

```
170  '    THE TEST MASTER INTERROGATES EACH PRODUCT AND LOGS DATA REPRESENTING
180  '    THE RESULTS OF PRODUCT SELF CHECKS (FLAGS) AS WELL AS ANALOG DATA.
190  '    THE DATA IS STORED IN AN ARRAY CALLED BOLD(L,Y) AND WIND(L,Y), AND
200  '    IS IMMEDIATELY ANALYZED AND STATUS DISPLAYED ON THE IBM'S CRT.
210  '    IF ANY CHANGE IS NOTED IN SYSTEM OR SELF TESTS STATUS FLAGS A HARD
220  '    COPY IS RECORDED. ALSO IF ANY ANALOG DATA IS OUTSIDE SPECIFIED LIMITS
230  '    AN APPROPRIATE ERROR MESSAGE IS RECORDED.
240
250     GOSUB 710                ' DISPLAY " STATUS " PAGE.
260  '
270     INST=3:ADDHI=0:CNTRL=1   ' SETUP MSGOUT$ FIXED FIELDS
280
290  '
300
310     FOR ADDLO = 0 TO 11
320     COMM = 1                 ' RETRIEVE EXPANDED STATUS DATA FROM PRODUCT(S)
330     V = ADDLO                ' SET Y (VERTICAL POSITION OF DAT(X,Y)) = TO
340                              ' ADDLO
350  '
360     GOSUB 3500               ' CLEAR INCOM RECEIVE BUFFER (DRIVER SOFTWARE)
370     GOSUB 3770               ' SEND INCOM MESSAGE
380     GOSUB 3870               ' RETRIEVE EXPANDED STATUS MESSAGE
390     GOSUB 2870               ' STORE DATA IN RAM BUFFER (ARRAY > BOLD(39,11))
400
410     GOSUB 1690               ' READ KEYBOARD.
420     IF DATAPGE = 0 THEN GOSUB 710    ' DISPLAY " STATUS " PAGE.
430     IF DATAPGE = -1 THEN GOSUB 1230  ' DISPLAY " INDIVIDUAL DATA " PAGE.
440  '
450  '
460     COMM = 6                 ' RETRIEVE WINDOW "A" DATA FROM PRODUCT(S)
470     GOSUB 3500               ' CLEAR INCOM RECEIVE BUFFER (DRIVER SOFTWARE)
480     GOSUB 3770               ' SEND INCOM MESSAGE
490     GOSUB 1940               ' RETRIEVE WINDOW DATA.
500     GOSUB 5170               ' STORE DATA IN RAM BUFFER (ARRAY > BUF(102,3))
510  '
520     GOSUB 1690               ' READ KEYBOARD.
530     IF DATAPGE = 0 THEN GOSUB 620    ' DISPLAY " STATUS " PAGE.
540     IF DATAPGE = -1 THEN GOSUB 1230  ' DISPLAY " INDIVIDUAL DATA " PAGE.
550  '
560     NEXT ADDLO
570  '
580     GOTO 260                 LOOP TO BEGINNING OF PROGRAM
590  '

10   '    FILENAME: XXXXXXXXX - DYNAMIC INCOM BURN-IN DIAGNOSTICS
20   '
30   '    THIS PROGRAM PERMITS THE IBM-PC TO BE USED AS A " PRODUCTION TEST
          MANAGER & DATA LOGGER" BY EXERCISING AND INTERROGATING SEVERAL (16)
          PRODUCT(S), "XXYYXXXXXXXXXXXX" UNDER VARIOUS TEST CONDITIONS.
40   '
46   '
50      GOSUB 500                SETUP PROGRAM: DEFINE ALL VARIABLES
60   '
70   '    BEGIN MAIN PROGRAM LOOP
80   '
82   '
84   '
86   '
88   '
90   '
100  '  *************************************************************
110  '  *************************************************************
120  '
130  '                    SYSTEM MASTER
140  '
150  '    THE TEST MANAGER EXERCISES EACH PRODUCT BY SELECTING 1 OF 14 " METERED
          PARAMETER " DISPLAYS AND INTERROGATES EACH BY REQUESTING THE DATA BEING
          DISPLAYED BY THE PRODUCT. DATA REPRESENTING EACH METERED PARAMETER
152  '    IS STORED IN AN ARRAY CALLED DAT(X,Y), AND IS IMMEDIATELY DISPLAYED ON
160  '    THE IBM'S CRT. ADDITIONALLY, SIX BYTES OF " RAW " DATA REPRESENTING IN-
          TERNAL FLAGS AND JUMPER CONFIGURATIONS ARE ALSO MONITORED. THE DATA IS
          LOGGED ONTO FLOPPY DISK, ONCE AN HOUR. IF A CHANGE IS NOTED IN EITHER
161  '    FLAGS OR JUMPERS' CONFIGURATION A HARD COPY IS RECORDED ON THE PRINTER
162  '
```

```
164  X = -1:SCOMM = -1
170  '
180  INST=3:ADDHI=0:CNTRL=1  ' SETUP MSGOUT$ FIXED FIELDS
190  SCOMM = SCOMM + 1       ' INCREMENT DISPSEL
192  IF SCOMM > 13 THEN GOTO 253
200  IF SCOMM > 13 THEN SCOMM = 0
210  COMM = 2                ' LOAD "CHANGE DISPSEL" COMMAND
220  FOR ADDLO = 0 TO 15
224  '
226  '
230  GOSUB 4000              ' SEND INCOM MESSAGE
240  NEXT ADDLO
253  '
259  X = X + 1
260  '
280  '
290  COMM = 1                ' RETRIEVE DATA FROM PRODUCT(S)
300  FOR ADDLO = 0 TO 15
302  Y = ADDLO               ' SET Y (VERTICAL POSITION OF DAT(X,Y)) = TO
                             ' ADDLO
310
320  GOSUB 2000              ' CLEAR INCOM RECEIVE BUFFER (DRIVER SOFTWARE)
330  GOSUB 4000              ' SEND INCOM MESSAGE
340  GOSUB 5000              ' RECEIVE INCOM MESSAGE
346  GOSUB 800               ' STORE DATA IN RAM BUFFER (ARRAY > DAT(30,16))
355  '
357  GOSUB 3000              ' CLEAR RECV(9,3) BUFFER
360  NEXT ADDLO
362  GOSUB 6000              ' DISPLAY PAGE 1 DATA.
363  GOSUB 7035              ' DISPLAY PAGE 2 DATA

10   REM *** GPIB POWER SETUP ***
20   REM
30   REM ---------------------------------------------------------
40   REM init of some strings
100  REM ---------------------------------------------------------
200  PARAM$="INIT/1/&H310/P/":GOSUB 10000
210  PRINT "PRESS C.R. TO CONTINUE"
220  K$=INKEY$:IF K$<> CHR$(13) THEN 220
230  DATA.STRING$="MES?"
235  PRINT "HELLO 235"
240  PARAM$="WR.STR/27/10/EOS/":GOSUB 10000
245  PRINT "HELLO 244"
250  PARAM$="RD.STR/47/10/EOS/":GOSUB 10000
255  PRINT "HELLO 255"
260  FOR PTR%=1 TO LEN(DATA.STRING$)-1
270  DAT%=ASC(MID$(DATA.STRING$,PTR%,1))
280  NEXT
290  PARAM$="SET.EOI/":GOSUB 10000
300  PRINT DATA.STRING$:END
9680 REM            IEEE-488 INTEFACE FOR THE IBM PC V4.2
9700 REM                   WRITTEN IN ADVANCED BASIC
9720 REM AND INCORPORATING ASSEMBLY LANGUAGE ROUTINES TO IMPLEMENT
9740 REM            DMA - DRIVEN GPIB TRANSACTIONS
9955 REM
9960 REM ******************* START OF SUBROUTINE *******************
9999 END
10000 GOSUB 21560                    'FETCH COMMAND
10020 ON (ASC(FLD$(0)) - 64) GOTO 10040,10820,10820,10820,10820,10820,10120,
      10820,10160,10820,10820,10190,10220,10820,10820,10260,10820,10360,10500,
      10600,10680,10820,10720,10820,10820,10820
10040 IF FLD$(0) = "ABORT"      GOTO 10940
10060 IF FLD$(0) = "ADC"        GOTO 11120
10080 IF FLD$(0) = "ADTL"       GOTO 19720
10100 IF FLD$(0) = "ADTR"       GOTO 19820   ELSE 10820
10120 IF FLD$(0) = "GET"        GOTO 11260
10140 IF FLD$(0) = "GTSB"       GOTO 12940   ELSE 10820
10160 IF FLD$(0) = "INIT"       GOTO 11800   ELSE 10820
10180 IF FLD$(0) = "LISTEN"     GOTO 20860
10200 IF FLD$(0) = "LLO"        GOTO 11660   ELSE 10820
10220 IF FLD$(0) = "MLA"        GOTO 20440
10240 IF FLD$(0) = "MTA"        GOTO 20680   ELSE 10820
10260 IF FLD$(0) = "PAR.POLL"   GOTO 17760
```

```
10280 IF FLD$(0)  = "PAS.CNT"       GOTO 23220
10300 IF FLD$(0)  = "PPD"           GOTO 18020
10320 IF FLD$(0)  = "PP.EN"         GOTO 19420
10340 IF FLD$(0)  = "PPU"           GOTO 18240   ELSE 10820
10360 IF FLD$(0)  = "RBST"          GOTO 18380
10370 IF FLD$(0)  = "RD.ARRY"       GOTO 24000
10380 IF FLD$(0)  = "RD.BYTE"       GOTO 17360
10400 IF FLD$(0)  = "RD.STR"        GOTO 14060
10420 IF FLD$(0)  = "RD.STR.D"      GOTO 14480
10440 IF FLD$(0)  = "RD.TO.FILE"    GOTO 14780
10460 IF FLD$(0)  = "RD.TO.FILE.D"  GOTO 15040
10480 IF FLD$(0)  = "REC.CNT"       GOTO 22860   ELSE 10820
10500 IF FLD$(0)  = "SDC"           GOTO 18580
10520 IF FLD$(0)  = "SDL"           GOTO 11520
10540 IF FLD$(0)  = "SDR"           GOTO 18780
10560 IF FLD$(0)  = "SER.POLL"      GOTO 18960
10580 IF FLD$(0)  = "SET.EOI"       GOTO 23440   ELSE 10820
10600 IF FLD$(0)  = "TALK"          GOTO 20960
```

```
1   02-27-1987   05:30:17   IQ2000    UNIT NO. 1        STARTUP STATUS:  NO RESP
2   02-27-1987   05:30:19   IQ2000    UNIT NO. 2        STARTUP STATUS:  NO RESP
3   02-27-1987   05:30:21   IQ2000    UNIT NO. 3        STARTUP STATUS:  NO RESP
4   02-27-1987   05:30:23   IQ2000    UNIT NO. 4        STARTUP STATUS:  NO RESP
5   02-27-1987   05:30:25   IQ2000    unit no. 5        STARTUP STATUS:  NO RESP
6   02-27-1987   05:30:27   IQ2000    UNIT NO. 6        STARTUP STATUS:  NO RESP
7   02-27-1987   05:30:29   IQ2000    UNIT NO. 7        STARTUP STATUS:  NO RESP
8   02-27-1987   05:30:32   IQDATA+   METER DATA        STARTUP STATUS:  NO RESP
9   02-27-1987   05:30:34   IQ1000    CURRENT ONLY      STARTUP STATUS:  NO RESP
```

ADDR = 0  TIME:06:58:15  DATE:02-27-1987

SYSTEM STATUS & INTERNAL TEST RESULTS

COMPRESSOR RUNNING > STATUS: 1
    M1 RELAY ACTIVE > STATUS: 1
    M2 RELAY ACTIVE > STATUS: 1
    EMERGENCY STOP ACTIVE > STATUS: 1
    UNLOAD MODULATE FUNCTION SEL.> STATUS: 1
    SURGE DETECTED > STATUS: 1
    LOW WATER FLOW DETECTED > STATUS: 1
    LOW SEAL AIR DETECTED > STATUS: 1
    DIRTY INLET FILTER DETECTED > STATUS: 1
    DIRTY OIL FILTER DETECTED > STATUS: 1
    LOW OIL LEVEL DETECTED > STATUS: 1
    HIGH COND. LEVEL DETECTED > STATUS: 1
    HIGH MOTOR TEMP. DETECTED > STATUS: 1
    START AND CONTINUE > STATUS: 1
    AUTO-DUAL > STATUS: 1
    UNLOAD MODULATE > STATUS: 1
    RUN ENABLE > STATUS: 1

ADDR = 1  TIME:06:58:24  DATE:02-27-1987

SYSTEM STATUS & INTERNAL TEST RESULTS

COMPRESSOR RUNNING > STATUS: 1
    M1 RELAY ACTIVE > STATUS: 1
    M2 RELAY ACTIVE > STATUS: 1
    EMERGENCY STOP ACTIVE > STATUS: 1
    UNLOAD MODULATE FUNCTION SEL.> STATUS: 1
    SURGE DETECTED > STATUS: 1
    LOW WATER FLOW DETECTED > STATUS: 1
    LOW SEAL AIR DETECTED > STATUS: 1
    DIRTY INLET FILTER DETECTED > STATUS: 1
    DIRTY OIL FILTER DETECTED > STATUS: 1
    LOW OIL LEVEL DETECTED > STATUS: 1
    HIGH COND. LEVEL DETECTED > STATUS: 1
    HIGH MOTOR TEMP. DETECTED > STATUS: 1
    START AND CONTINUE > STATUS: 1
    AUTO-DUAL > STATUS: 1
    UNLOAD MODULATE > STATUS: 1
    RUN ENABLE > STATUS: 1

```
ADDR =  1  TIME:06:58:32  DATE:02-27-1987

ANALOG DATA IN ERROR

VIBRATION STAGE 1
        VIBRATION STAGE 2
        VIBRATION STAGE 3
        VIBRATION STAGE 4
        SYSTEM PRESSURE
        VIBRATION SHAFT B
        DISCHARGE PRESSURE 1
        TEMPERATURE AA
        TEMPERATURE BB
        TEMPERATURE CC
        TEMPERATURE EE
        INLET AIR TEMP.
        S2 AIR
        S3 AIR
        POSITION VALVE #1
        POSITION VALVE #2
        MOTOR CURRENT
```

We claim:

1. An installation for the dynamic burn-in testing of a plurality of digital components and digital component assemblies, comprising:
   a personal computer (PC);
   a burn-in chamber containing said plurality of digital components and components assemblies under testing;
   power supply means connected through said burn-in chamber to said plurality;
   means for controlling the operation of said burn-in chamber;
   bidirectional digital communication means between said PC computer and said plurality for providing a data highway therebetween;
   predetermined reference data characterizing the operation of the respective components and assemblies of components of said plurality being stored for comparison purpose in said PC computer with a related address;
   at least one status representative signal being generated by said plurality in relation to a corresponding address for indicating a testing condition;
   said bidirectional communication means being controlled by said PC computer to individually and selectively select a status representative signal as an indication of a testing condition at an address relative to one of said digital components and component assemblies in said plurality, and to retrieve the same therethrough; a corresponding reference data being compared by said PC computer with said selected and retrieved status representative signal for generating an indication of a critical testing condition;
   whereby dialoguing through addresses with any of said plurality permits ascertaining with said PC computer the reliability of said digital components and components assemblies through a failure-free burn-in time.

2. The burn-in installation of claim 1 with said digital components being operated in a stand alone slave mode, the PC computer sending through said communication means at least one command signal individually and selectively to each of said digital components to change the status thereof and the PC computer retrieving therefrom through said communication means at least one status representative signal following such command signal.

3. The burn-in installation of claim 1 with said component assemblies each including a local microcomputer and being operated in an expanded slave mode, with said local microcomputer being operative to function with the associated digital components as in real life under said power supply means, the PC computer sending through said communication means individually and selectively to said component assemblies an interrupt signal for interrupting the operation thereof and for opening an interrogation period, with following such interrupt signal the PC computer sending to such component assembly at least one interrogating signal to the local microcomputer and retrieving therefrom a corresponding status representative signal.

4. The installation of claim 1 with said communication means including a common digital data highway and a plurality of local bilateral gating means, said digital data highway extending from the PC computer and going through said burn-in chamber, each of said local bilateral gating means being mounted within said burn-in chamber and associated with a corresponding one of the digital components and component assemblies for providing communication both-ways upon the reception of data from the PC computer and upon the availability of data for the PC computer.

5. The installation of claim 4 with master bilateral gating means being provided between the PC computer and said common digital data highway for providing communication both-ways upon a transmission from the PC computer and upon a reception of data for the PC computer.

6. The installation of claim 5 with interfacing means provided between the PC computer and said master bilateral gating means for translating the PC computer language into data highway language.

7. The installation of claim 6 with said common digital data highway being a dual daisy-line connected to any digital component and digital component assembly of said plurality.

* * * * *